US012295907B2

(12) United States Patent
Kim

(10) Patent No.: US 12,295,907 B2
(45) Date of Patent: May 13, 2025

(54) SITTING TOILET HAVING FOOT HEALTH CARE DEVICE ATTACHED THERETO

(71) Applicant: Deok Woo Kim, Seoul (KR)

(72) Inventor: Deok Woo Kim, Seoul (KR)

( * ) Notice: Subject to any disclaimer, the term of this patent is extended or adjusted under 35 U.S.C. 154(b) by 126 days.

(21) Appl. No.: 18/006,499

(22) PCT Filed: Jul. 23, 2021

(86) PCT No.: PCT/KR2021/009582
§ 371 (c)(1),
(2) Date: Jan. 23, 2023

(87) PCT Pub. No.: WO2022/019717
PCT Pub. Date: Jan. 27, 2022

(65) Prior Publication Data

US 2023/0293387 A1 Sep. 21, 2023

(30) Foreign Application Priority Data

Jul. 24, 2020 (KR) ........................ 10-2020-0092614

(51) Int. Cl.
*A61H 35/00* (2006.01)
*A47K 7/02* (2006.01)
(Continued)

(52) U.S. Cl.
CPC ........... *A61H 35/006* (2013.01); *A47K 7/026* (2013.01); *A47K 7/04* (2013.01); *A47K 17/02* (2013.01); *B05B 1/16* (2013.01); *B05B 3/021* (2013.01)

(58) Field of Classification Search
CPC ........ A47K 3/022; A47K 1/14; A61H 35/006; E03C 1/01; E03D 11/025
See application file for complete search history.

(56) References Cited

U.S. PATENT DOCUMENTS 3,612,052 A * 10/1971 Krummenacher ... A61H 35/006 604/23
3,810,463 A * 5/1974 Krummenacher ... A61H 35/006 601/114
(Continued)

FOREIGN PATENT DOCUMENTS

CN 2846560 Y * 12/2006
CN 110747958 A 2/2020
(Continued)

OTHER PUBLICATIONS

International Search Report for PCT/KR2021/009582 dated Nov. 5, 2021 (PCT/ISA/210).

*Primary Examiner* — Erin Deery
(74) *Attorney, Agent, or Firm* — Sughrue Mion, PLLC

(57) ABSTRACT

A sitting toilet having a foot health care device attached thereto includes: a main body which includes an accommodation part, which is in the front lower end and has an accommodation space in which the foot health care device is accommodated, and a toilet water tank and a wastewater duct which are formed across the upper end and the rear lower end; and a foot health care device having an inner space in which a user's feet are placed and a foot washing tank in which a sewage outlet is formed at the lower end. The inner space of the foot washing tank in which the user's feet are placed is opened as the foot health care device slides forward from the accommodation part of the main body, and the foot health care device is accommodated in the main body as the foot health care device slides backward.

15 Claims, 20 Drawing Sheets

(51) Int. Cl.

| | |
|---|---|
| ***A47K 7/04*** | (2006.01) |
| ***A47K 17/02*** | (2006.01) |
| ***B05B 1/16*** | (2006.01) |
| ***B05B 3/02*** | (2006.01) |

(56) References Cited

U.S. PATENT DOCUMENTS

| | | | | |
|---|---|---|---|---|
| 3,887,947 | A * | 6/1975 | Tosca | E03C 1/01 4/664 |
| 4,637,079 | A * | 1/1987 | Hodge | E03D 11/00 4/252.5 |
| 6,405,390 | B2 * | 6/2002 | Kuen | A47K 3/022 601/158 |
| 6,829,789 | B1 | 12/2004 | Liang | |
| 2020/0077846 | A1 * | 3/2020 | Bertani | A47K 7/026 |

FOREIGN PATENT DOCUMENTS

| | | | |
|---|---|---|---|
| JP | 2007-222279 | A | 9/2007 |
| KR | 0130896 | Y1 * | 12/1998 |
| KR | 10-2011-0103020 | A | 9/2011 |
| KR | 20110103020 | A * | 9/2011 |

* cited by examiner

A-A'

SITTING TOILET HAVING FOOT HEALTH CARE DEVICE ATTACHED THERETO

CROSS REFERENCE TO RELATED APPLICATIONS

This application is a National Stage of International Application No. PCT/KR2021/009582 filed Jul. 23, 2021, claiming priority based on Korean Patent Application No. 10-2020-0092614 filed Jul. 24, 2020.

TECHNICAL FIELD

The present disclosure relates to a sitting toilet, and particularly, to a sitting toilet having a foot health care device attached thereto.

BACKGROUND ART

A sitting toilet in which a person sits and relieves himself or herself as if the person sits on a chair is also called a toilet bowl or a toilet seat, and is one of the essential goods which are very frequently used and play important roles in daily life.

The sitting toilet has a form in which a person can sit on the sitting toilet, and may be used in relation to a rest or washing even if a person does not relieve himself or herself because the sitting toilet is basically installed in the bathroom at home. To the present day, there is no example in which an additional function has been commercialized and used in addition to a function related to the discharge of the bowels, such as the washing of private parts.

Meanwhile, a behavior that is important and that is frequently performed in the bathroom in daily life is the washing of a foot.

A foot is likely to be dried or become rough because the foot produces three times more sweat than other body parts and has almost no sebaceous gland. If the foot is not properly managed, there is a risk for various types of foot diseases, such as athlete's foot.

In particular, when pandemic viruses are raging or air pollution is severe due to fine dust these days, a person must keep his or her foot clean after returning home in order to keep his or her health.

In general, when washing his or her foot, he or she bends his back so that his or her hands can reach his or her foot, and wipes every corner of the foot with his or her hands. However, a herniated disk patient or a pregnant woman who has a difficulty in taking this behavior, the old and the infirm who have a bad balance, etc. may have a great difficulty in autonomously washing their feet because they feel uncomfortable with such a movement itself, and are not free from a safety problem, such as slipping.

Accordingly, conventional foot washing products may be placed around a sitting toilet that serves as a chair so that a user can safely wash his or her feet, or may be attached to the sitting toilet to be used in some cases. However, they still have a long way to go in terms of effectiveness because several unnecessary problems, including drainage treatment, are always present.

For example, a common sitting toilet has a structure in which the sitting toilet is installed closely to a floor and an installation portion thereof is sealed in order to block smell. Accordingly, if a foot washing product is attached to the sitting toilet, there is a problem in that it is difficult to install a wastewater duct.

DISCLOSURE

Technical Problem

The present disclosure has been proposed to solve the aforementioned problems, and an object of the present disclosure is to provide a sitting toilet in which a foot health care device can be used even at a narrow space by attaching the foot health care device to a receiving part that is disposed on the lower side of a main body at the front thereof in the form of a sliding structure.

In particular, the present disclosure is to provide a sitting toilet which enables foot washing and a foot bath to be safely performed and also has both convenience and practicality by constructing the sitting toilet so that a user can use the cover of the sitting toilet as a chair.

Objects to be achieved by the present disclosure are not limited to the aforementioned objects, and the other objects not described above may be evidently understood from the following description by those skilled in the art.

Technical Solution

A sitting toilet according to an embodiment of the present disclosure includes a main body including a receiving part having a storage space in which a foot health care device is received at the bottom of the main body at a front thereof and including a toilet tank and a wastewater duct formed across a top and bottom of the main body in a rear thereof; and the foot health care device including a foot washing tank having an inner space in which a foot of a user is placed and having a wastewater outlet formed at the bottom of the foot washing tank.

In this case, as the foot health care device slides forward from the receiving part of the main body, the inner space of the foot washing tank in which the foot of the user is placed is opened, and as the foot health care device slides backward, the foot health care device operates to be received in the main body.

The receiving part of the main body may include a sliding rail in a sliding movement section of the foot washing tank. The foot washing tank may have a caster movable on the sliding rail in some section of a top and bottom of the foot washing tank.

An outer wall for airtightly protecting the sliding movement section of the foot washing tank and supporting a front of the main body may be formed at both ends of the receiving part of the main body. Furthermore, an inner wall may be provided inside the receiving part, and can block the inflow of stink from the wastewater outlet of a bathroom floor by sealing the bottom of the inner wall and the bathroom floor. The main body may further include a buffer part for buffering an impact on a portion that touches the rear end of the foot washing tank.

The receiving part of the main body has a storage space having a shape and size corresponding to the foot washing tank.

The foot health care device includes a spray unit, a washing water supply unit, and a user input unit.

The spray unit sprays predetermined washing water toward an inner space of the foot washing tank.

The washing water supply unit supplies the spray unit with the washing water.

The user input unit is disposed outside the foot washing tank, and displays an operating state of the foot health care device and provides various types of function buttons.

The foot health care device needs to use the wastewater duct of a sitting toilet or a separate sewage duct in order to discharge wastewater of the foot washing tank. To this end, the foot health care device may further include a wastewater discharge unit that is disposed between the outlet and the wastewater outlet of the bathroom floor.

In this case, the wastewater outlet of the bathroom floor may be a wastewater outlet for the sitting toilet, which treats wastewater of the sitting toilet, and may be a wastewater outlet for sewage treatment, which treats sewage. In general, it is preferred that wastewater is discharged to the wastewater outlet of the sitting toilet because only a wastewater outlet for a sitting toilet is provided in a bathroom floor within a space under a sitting toilet. Meanwhile, the wastewater discharge unit may be formed in a shape that is partially deformed from the wastewater duct of the main body.

The foot washing tank of the foot health care device according to the present disclosure may be manufactured in a way to be capable of variably deforming the inner wall or adjusting the height thereof in order to avoid a space limit that occurs because the bottom of the toilet tank of the main body falls down.

In a structure in which the inner wall is variably deformed, a method of constructing the entire inner wall by using a highly elastic material is preferred, but the inner wall may be implemented by using another method by considering durability.

In this case, the inner wall of the foot washing tank includes a fixing wall body, a variable wall body, and a connection part that connects the fixing wall body and the variable wall body and seals a connection portion of the fixing wall body and the variable wall body so that water does not leak.

The fixing wall body has a space that is molded along with the foot washing tank and at a central part of which the variable wall body will be disposed. The connection part is used when the variable wall body and the fixing wall body are combined. Three surfaces except the top of the variable wall body are combined with the fixing wall body by using the connection part. Accordingly, when being combined by using the connection part, the variable wall body and the fixing wall body are maintained as a wall body having a rectangular shape when viewed on a plane. However, when the foot washing tank is disposed in the receiving part of the main body, the variable wall body is folded into the foot washing tank along a shape of the bottom of the toilet tank of the main body. Accordingly, the connection part needs to be deformed by incorporating such folding. Accordingly, it is preferred that the connection part is constructed so that a portion that connects the left and right of the variable wall body can be elastically deformed and a portion that connects the lower part of the variable wall body can be folded.

In the case of the method of variably adjusting the height of the inner wall of the foot washing tank, when the inner wall is inserted into the main body, the height of the inner wall needs to be adjusted to be lowered so that the inner wall is not caught in the bottom of the toilet tank. When the foot washing tank is disposed forward from the main body in order for a user to use the foot health care device, the height of the inner wall needs to be adjusted to be raised.

A toe washing unit for washing between toes of the user may be further included in the inner space of the foot washing tank of the foot health care device.

The toe washing unit includes a toe spray nozzle configured to spray the washing water between the toes of the user, and a washing member attached to an outside of the toe spray nozzle and configured to remove a polluted material stuck between the toes of the user.

The spray unit includes one or more side spray nozzles disposed in an inner circumferential surface of the foot washing tank and configured to spray water laterally, and an upward spray nozzle installed at the bottom of the foot washing tank and configured to spray water upward. In this case, a nozzle disposed at the front end of the side spray nozzle is disposed to be higher than a nozzle disposed at the rear end of the side spray nozzle.

The spray unit may further include a downward spray nozzle configured to spray water toward the bottom of the foot washing tank within the foot washing tank, a cleaning solution nozzle disposed within the foot washing tank and configured to spray a cleaning solution, and a spray valve connected between the downward spray nozzle and the cleaning solution nozzle and configured to selectively adjust the spray of the downward spray nozzle and the cleaning solution nozzle.

The foot health care device may further include a control unit connected to the user input unit and configured to control the spray unit and the toe washing unit.

In this case, it is preferred that the control unit controls at least one of a spray pressure, a spray method, and a spray angle of the spray unit.

The foot health care device may further include a heel washing unit rotatably installed at a rear end of the foot washing tank within the foot washing tank and configured to wash a heel of the user.

The heel washing unit may be disposed to have a predetermined inclination along a shape of the heel.

The heel washing unit may include a rotation member connected to the rear end of the foot washing tank within the foot washing tank in a width direction or length direction thereof and having a rotatable structure, a detachable brush having a structure that surrounds the rotation member and having an external rough surface, and a driving unit configured to rotate the rotation member by the control unit.

Advantageous Effects

The sitting toilet having the foot health care device attached thereto according to the present disclosure can solve a restriction problem in the space because the foot health care device is attached to the receiving part disposed under the sitting toilet at the front thereof in the form of a sliding structure.

Furthermore, a user can wash his or her toes in the foot washing tank of the foot health care device that has been added to the sitting toilet in a comfortably sitting posture, and wastewater of the foot washing tank can be discharged to the wastewater outlet of a bathroom floor without the inflow of smell.

Accordingly, according to the foot health care device attached to the sitting toilet according to the present disclosure, a foot washing and a foot bath are possible in a very pleasant environment because a user can conveniently discharge wastewater without having to worry about the inflow of stink while cleanly washing his or her toes.

Furthermore, the present disclosure can provide even convenience and practicality by constructing the cover of the sitting toilet so that a user can use the cover as a chair.

Furthermore, the foot health care device attached within the sitting toilet of the present disclosure has a structure in which a user can evenly wash the sole and toes of his or her foot even without using his or her hand and bending the waist of the user. Accordingly, even a disabled person who has a restricted movement can conveniently wash his or her feet and perform and a foot bath.

MODE FOR INVENTION

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims. Terms used in this specification are used to describe embodiments and are not intended to limit the present disclosure. In this specification, an expression of the singular number also includes an expression of the plural number unless clearly defined otherwise in the context. The term "comprises" and/or "comprising" used in this specification does not exclude the presence or addition of one or more other components, steps, operations and/or elements in addition to mentioned components, steps, operations and/or elements Hereinafter, preferred embodiments of the present disclosure are described in detail with reference to the accompanying drawings. As a basic structure of a sitting toilet according to the present disclosure follows a common sitting toilet, a description of a structure itself of the sitting toilet that has been already known is omitted for better understanding and convenience of description, and a foot health care device attached to the sitting toilet and a structure in which the foot health care device has been attached to the sitting toilet and an operation thereof are chiefly described and illustrated in detail.

Figure 1:
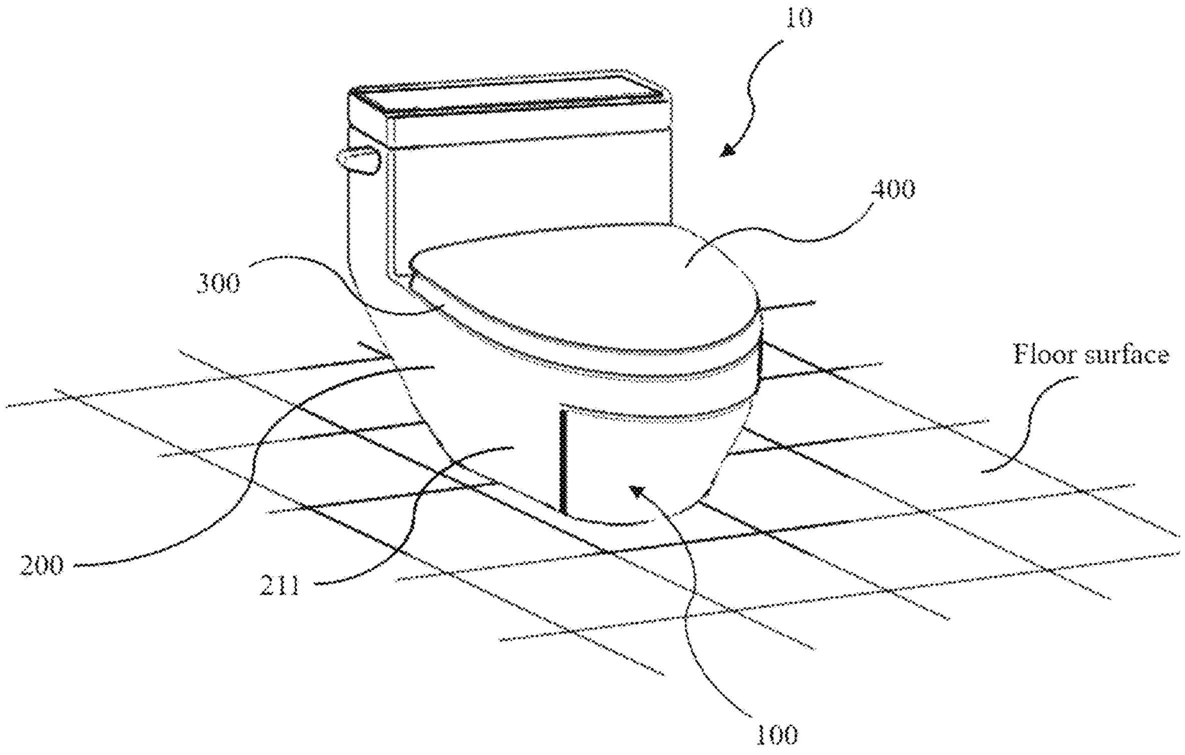
FIG. 1 is a diagram schematically illustrating a sitting toilet having a foot health care device attached thereto according to an embodiment of the present disclosure.
Figure 2:
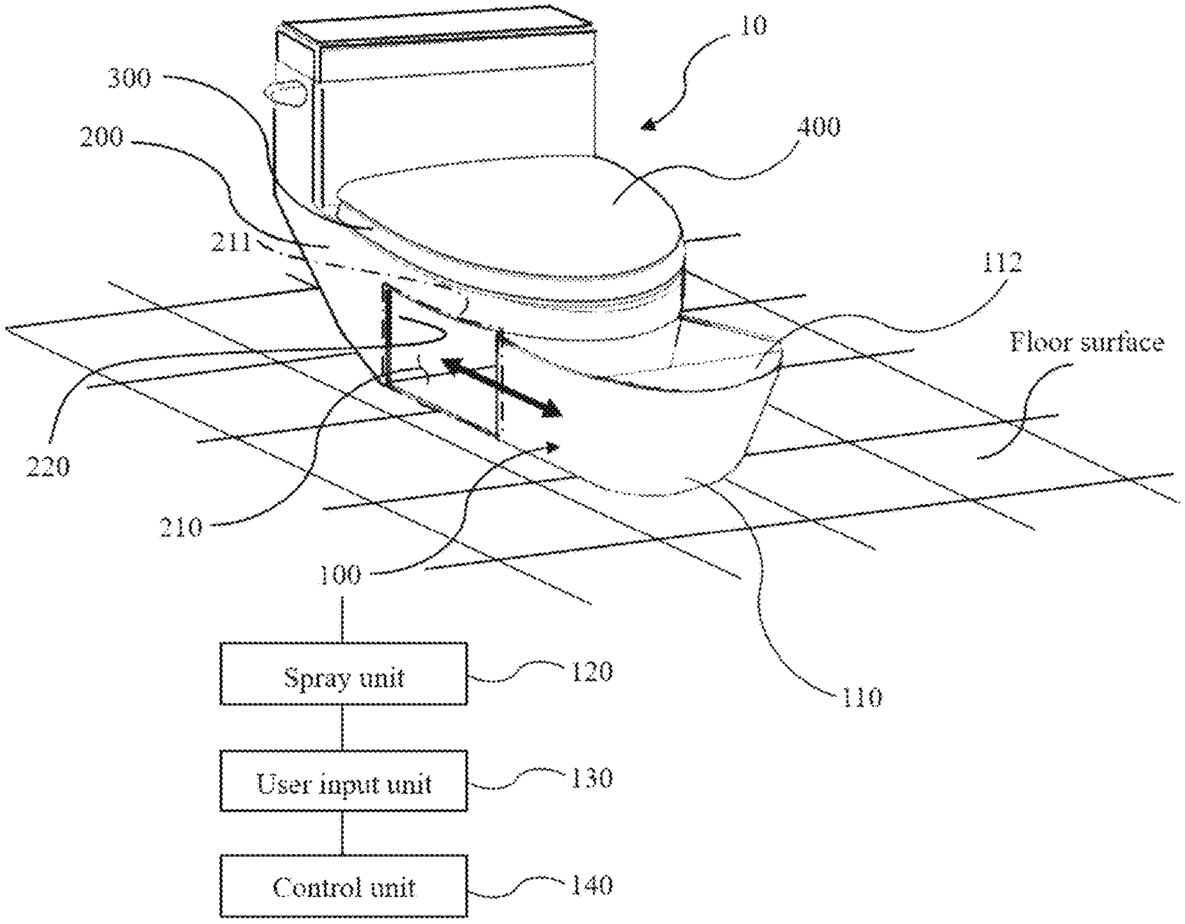
FIG. 2 is a diagram schematically illustrating an example of an operation of the sitting toilet having the foot health care device attached thereto according to an embodiment of the present disclosure.

FIG. 1 is a diagram schematically illustrating the sitting toilet having the foot health care device attached thereto according to an embodiment of the present disclosure. FIG. 2 is a diagram illustrating an example of an operation of the sitting toilet having the foot health care device attached thereto according to an embodiment of the present disclosure.

As illustrated in FIGS. 1 and 2, a sitting toilet 10 according to an embodiment of the present disclosure has a structure in which a foot health care device 100 has been attached in a sliding way. In this case, a main body 200 that forms a frame of the sitting toilet 10 has a toilet tank (not illustrated) that is formed from the top of the main body at the front thereof to the bottom of the main body at the rear thereof. A wastewater duct (not illustrated) of the sitting toilet is installed at the bottom of the main body.

A receiving part 210 is formed on the lower side of the main body 200 at the front thereof. The receiving part 210 is a storage space capable of receiving the foot health care device 100, and has a shape and size corresponding to a foot washing tank 110 of the foot health care device 100. The foot washing tank 110 of the foot health care device 100 has a structure that is movable from the receiving part 210 of the main body 200 in a sliding way.

For example, a sliding rail (not illustrated) and a caster (not illustrated) capable of moving on the sliding rail may be provided at the top and bottom of the foot washing tank 110 and a connection portion within the main body 200. It is better that the sliding rail has a length corresponding to a path along which the foot washing tank 110 is movable from the front of the foot washing tank 110 to the back of the foot washing tank 110 and vice versa, for a stable sliding movement of the foot washing tank 110. A stopper (not illustrated) may be provided every unit length on the sliding rail so that the foot washing tank 110 is stably stopped.

The foot washing tank 110 may have a structure in which the foot washing tank is slid and moved by electricity through an electric linear actuator (not illustrated) within the main body 200. As another embodiment, the foot washing tank 110 may have a structure in which the foot washing tank is manually slid.

As another example, an elastic member (not illustrated), such as a spring, may be connected to the top and bottom of the foot washing tank 110 and a connection portion within the main body 200, so that a user can manually open and close the foot washing tank 110 from the main body 200 with less efforts as if the user opens a drawer from a dresser.

In this case, the foot washing tank 110 has a structure in which the foot washing tank returns to its initial location by the elastic member. If the user performs a foot washing and a foot bath, the foot washing tank 110 needs to be fixed at a corresponding location.

In this case, the stopper that is disposed every unit length of the sliding rail may fix the foot washing tank 110 to the corresponding location. For example, a fixing hole (not illustrated) is formed every unit length of the sliding rails disposed at both ends of the top and bottom of the main body 200, and the stopper has a structure in which the stopper penetrates the left and right of the sliding rail with the fixing hole interposed therebetween.

An outer wall 211 for airtightly protecting a sliding movement section of the foot washing tank 110 and supporting the main body 200 may be disposed at both ends of the receiving part 210 of the main body 200. The outer wall 211 may be constructed in a way to be integrated with the main body 200 or constructed in a separated type in the state in which the outer wall has been disposed outside the foot washing tank 110.

In this case, the outer wall 211 has a form in which the outer wall supports the front end of the main body 200 against the floor by surrounding both ends of the foot washing tank 110, thus distributing the weight of a user, which is applied to the front end of the main body 200 when the user sits on the sitting toilet 10. Accordingly, the outer wall 211 can prevent the possibility that the main body 200 may be damaged by the weight that is applied to the front end of the sitting toilet 10. Furthermore, the main body 200 has an inner wall 220 inside the receiving part 210, and has a shielding structure capable of blocking the inflow of smell from the wastewater duct or a wastewater outlet by sealing the bottom of the main body and a bathroom floor by using a separate finishing material (e.g., silicon or concrete).

When the foot washing tank 110 of the foot health care device 100 is repeatedly slid and moved from the receiving part 210 of the main body 200, there is a risk of wear at a contact portion of the foot washing tank because an impact is applied to the corresponding contact portion. Accordingly, the main body 200 may have a buffer part (not illustrated) that reduces the impact at a portion of the main body 200 that touches the rear end of the foot washing tank 110.

In the drawings, a sitting toilet cover 400 seems to be similar to the existing cover. However, in order to provide convenience when a user uses the foot health care device 100, the sitting toilet cover 400 of the present disclosure may be constructed in the form of a chair that rotates around a rotation axis (not illustrated) thereof and has a back (not illustrated) of the chair.

For example, the sitting toilet cover 400 has a double-layered structure. One layer of the sitting toilet cover that is disposed on the lower side thereof is made of a basic sheet (not illustrated) on which a user may sit. The other layer of the sitting toilet cover that is disposed on the upper side thereof is formed of the back of the chair.

In this case, the basic sheet may have a sheet groove (not illustrated) that is depressed and formed in a section in which the user sits. When the back of the chair overlaps the basic sheet, the back of the chair may have a shape and size corresponding to the sheet groove.

That is, the back of the chair is maintained in a horizontal state when being inserted into the sheet groove, and is maintained in a vertical state in which the back of a user touches the back of the chair when the back of the chair is detached from the sheet groove and rotated in a radius of about 90 degrees. A rotation operation between the back of the chair and the basic sheet may be performed by a manual manipulation of a user or may be automatically performed by a separate button (not illustrated) function.

A cushion (not illustrated) made of a waterproof material may be disposed between the back of the chair and the sheet groove. Such a cushion may be constructed in a replacement type in which the cushion can be selectively mounted and detached between the back of the chair and the sheet groove.

Meanwhile, the foot health care device 100 includes the foot washing tank 110, a spray unit 120, a user input unit 130, and a control unit 140.

The foot washing tank 110 may have an electronic circuit board and a related part capable of driving the foot health care device 100 airtightly embedded therein. The foot washing tank includes parts, such as various types of cables or sensors, an actuator, a switch, and an LED, and includes various types of parts connected thereto.

The foot washing tank 110 basically has a space in which the feet of a user are placed therein, and has a form in which the top of the foot washing tank is opened. The foot washing tank 110 has a structure capable of being inserted into the receiving part 210 of the main body 200 as described above, and may be opened and closed from an opened surface of the main body 200 to the front and back of the sitting toilet 10 in a sliding way.

The spray unit 120 sprays predetermined washing water toward an inner space of the foot washing tank 110.

The user input unit 130 is installed outside the foot washing tank 110 or in a foot washing tank cover 112, and displays an operating state of the device and provides various types of function buttons. The user input unit 130 allows various pre-settings.

The control unit 140 is one element capable of generally integrating and controlling the device, and controls the driving of the device that is suitable for a corresponding function when a button of the corresponding function in the user input unit 130 is pressed in response to a manipulation command of a user.

Figure 3:
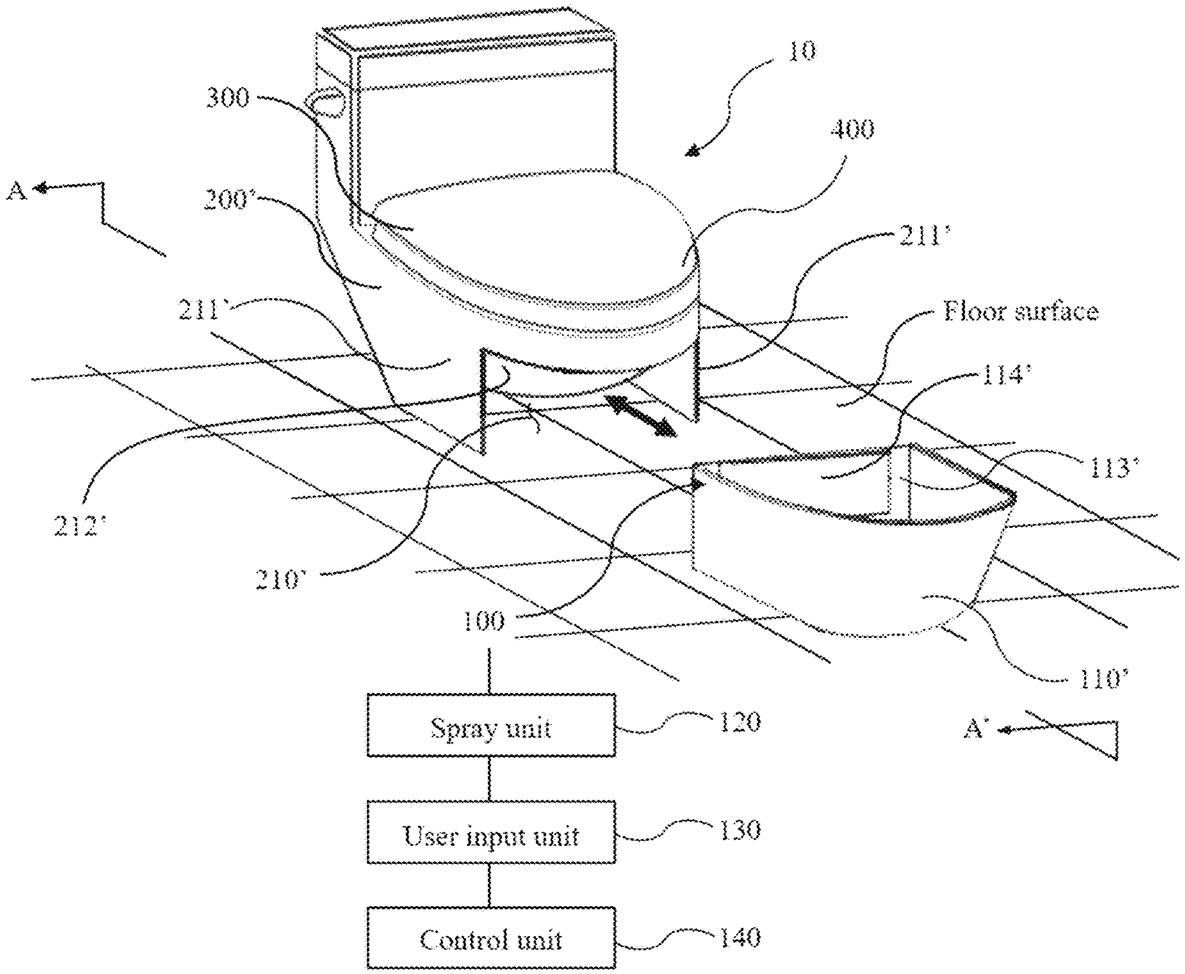
FIG. 3 is a diagram schematically illustrating an example of a modified operation of the sitting toilet having the foot health care device attached thereto according to an embodiment of the present disclosure.

FIG. 3 is a diagram schematically illustrating an example of a modified operation of the sitting toilet having the foot health care device attached thereto according to an embodiment of the present disclosure.

Referring to FIG. 3, the foot health care device 100 has a structure in which the foot health care device is received in a way to slide from a receiving part 210' of a main body 200' of the sitting toilet 10, which has the same method as that described with reference to FIG. 2, but has a slightly different form.

The receiving part 210' of the main body 200' has a relatively narrow cross section compared to the receiving part 210 of the main body 200 in FIG. 2. The main body 200' can further secure the space in which the wastewater duct of the sitting toilet is installed by a reduced area of the receiving part 210'.

A foot washing tank 110' has a U-shaped form, and the receiving part 210' has a size and shape corresponding to the foot washing tank 110'. In this case, the foot washing tank 110' may be used as a space in which both the feet of a user can be washed simultaneously, and the structure of the foot washing tank 110' may be changed in a form in which both the feet can be separately washed through respective partitions (not illustrated) that selectively divide the space.

Meanwhile, a variable wall body 114' that forms an inner wall of the foot washing tank 110' has a structure corresponding to a shape of a bottom 212' of the toilet tank, which is disposed at the front part of the main body 200', so that the foot washing tank 110' is precisely inserted into the receiving part 210'.

Figure 4:
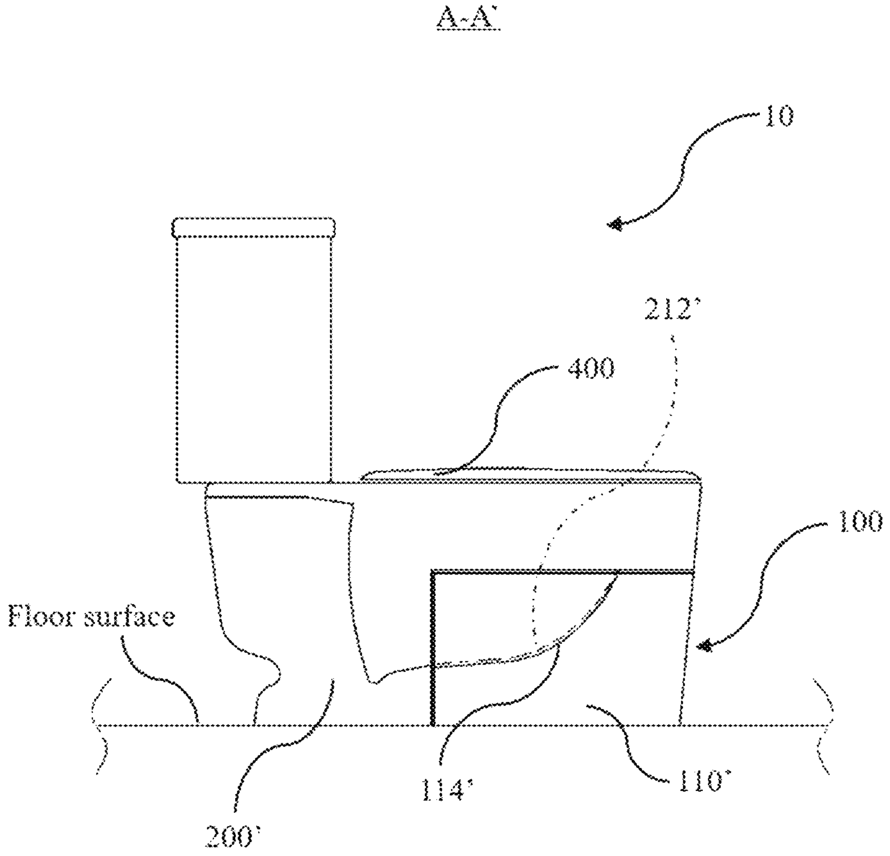
FIGS. 4 and 5 are side views schematically illustrating a coupling structure of a foot washing tank taken along line A-A' indicated in FIG. 3.
Figure 5:
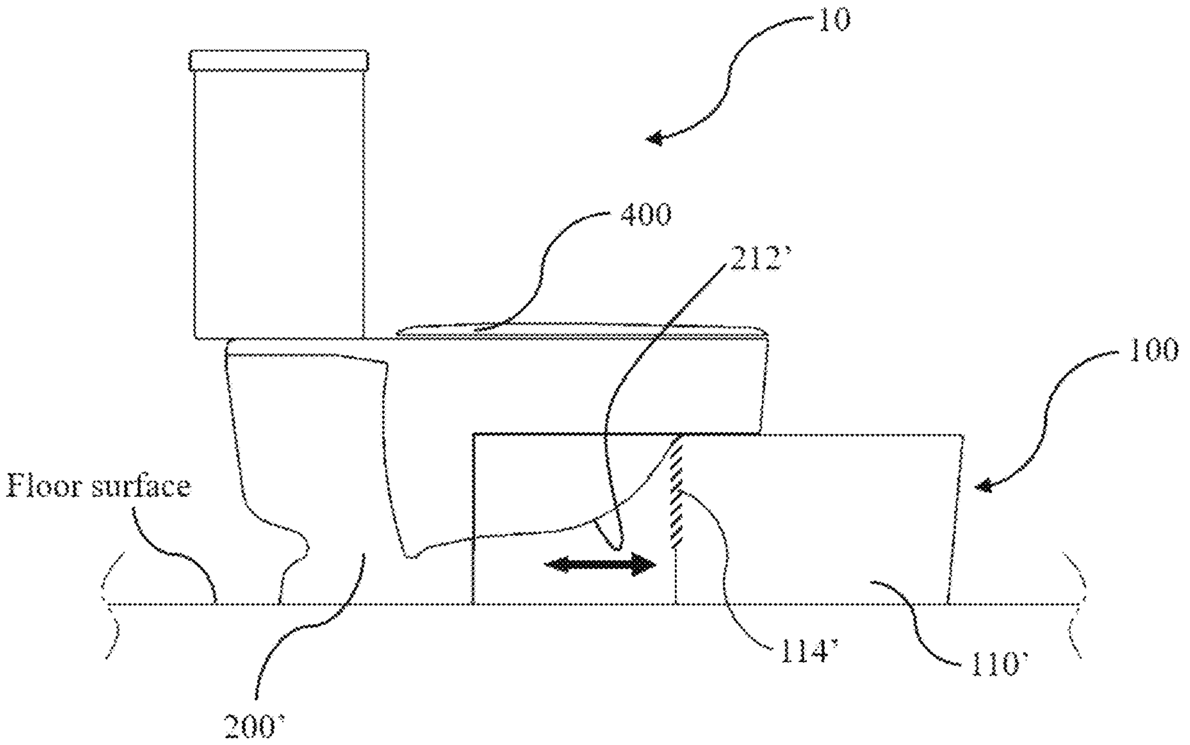

FIGS. 4 and 5 are side views schematically illustrating a coupling structure of the foot washing tank taken along line A-A' indicated in FIG. 3. FIGS. 4 and 5 are diagrams illustrating an embodiment in which a foot washing tank which is high in height and on which both feet can be placed is used, unlike FIG. 3.

As illustrated in FIGS. 4 and 5, the foot washing tank 110' of the foot health care device 100 is combined with the front of the main body 200' of the sitting toilet 10 in a sliding way.

In this case, the bottom 212' of the toilet tank that is formed at the top of the main body 200' and the bottom of the main body 200' at the rear thereof affects the height of the foot washing tank 110'.

If the height of the foot washing tank 110' is low, the bottom 212' of the toilet tank and the foot washing tank 110' do not mutually affect each other. If the height of the foot washing tank 110' needs to be increased (e.g., in the case of a toilet using a siphon method, the height of a foot washing tank needs to be increased because a toilet tank falls down), however, a problem may occur. That is, the foot washing tank 110' may be hung at the bottom 212' of the toilet tank when being received in the main body 200'. In order to avoid such a problem, the main body 200' may further secure a front space in order to receive the foot washing tank 110' therein or the foot washing tank 110' inevitably protrudes without being fully received in the main body 200'.

In order to solve such an aspect, the entire inner wall or a part of the inner wall of the foot washing tank 110' may be made of a flexible material.

For example, the inner wall of the foot washing tank 110' is partitioned into a central part and both ends. The variable wall body 114' that meets the bottom 212' of the toilet tank is disposed at the central part of the inner wall. A fixing wall body 113' that does not meet the bottom 212' of the toilet tank is disposed at both ends of the inner wall.

The variable wall body 114' may be made of a rubber material capable of being elastically deformed. In this case, the rubber material includes natural rubber and synthetic rubber, and may be formed in the form of one of silicon, urethane, and latex among the natural rubber and synthetic rubber.

In particular, latex is a material having a form in which fine polymer particles are distributed in an aqueous solution and is one of materials that are widely used. Accordingly, latex may have better utilization depending on its use and environment.

Accordingly, the variable wall body 114' may be elastically deformed in accordance with an appearance of the bottom 212' of the toilet tank of the main body 200' when the foot washing tank 110' is inserted into the main body 200' (when the foot washing tank 110' is disposed inside the front part of the main body).

It is preferred that the fixing wall body 113' is airtightly connected at both ends of the variable wall body 114'.

FIGS. 6 to 9 are diagrams schematically illustrating an example in which the inner wall of the foot washing tank is elastically deformed in the sitting toilet having the foot health care device attached thereto according to an embodiment of the present disclosure.

FIGS. 6 to 9 are diagrams for illustrating an example in which the variable wall body 114' of the foot washing tank 110' is varied depending on an external contact, and do not illustrate a detailed construction (illustrated in a drawing to be described later) of the foot washing tank 110'.

Accordingly, FIGS. 6 to 9 are merely drawings illustrated to easily understand that the variable wall body 114' of the foot washing tank 110' is made of a material that is elastically deformed. A shape of the foot washing tank 110' is not restricted by forms illustrated in the drawings.

Figure 6:
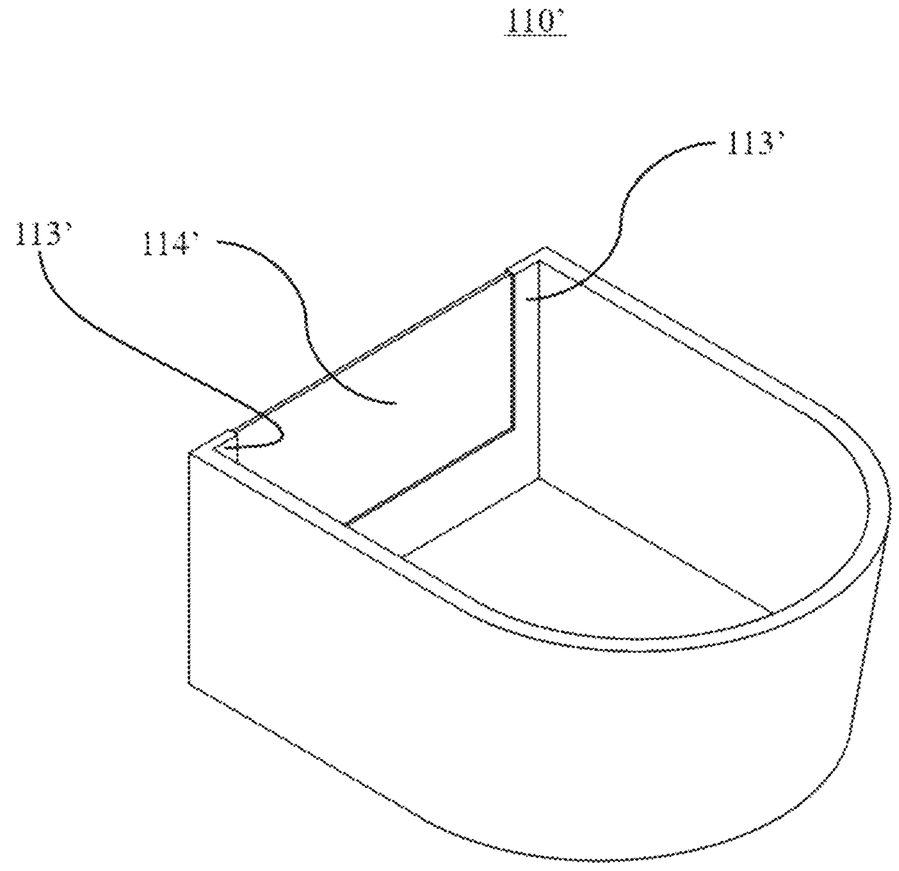
FIGS. 6 to 9 are diagrams schematically illustrating an example in which the inner wall of the foot washing tank is elastically deformed in the sitting toilet having the foot health care device attached thereto according to an embodiment of the present disclosure.
Figure 7:
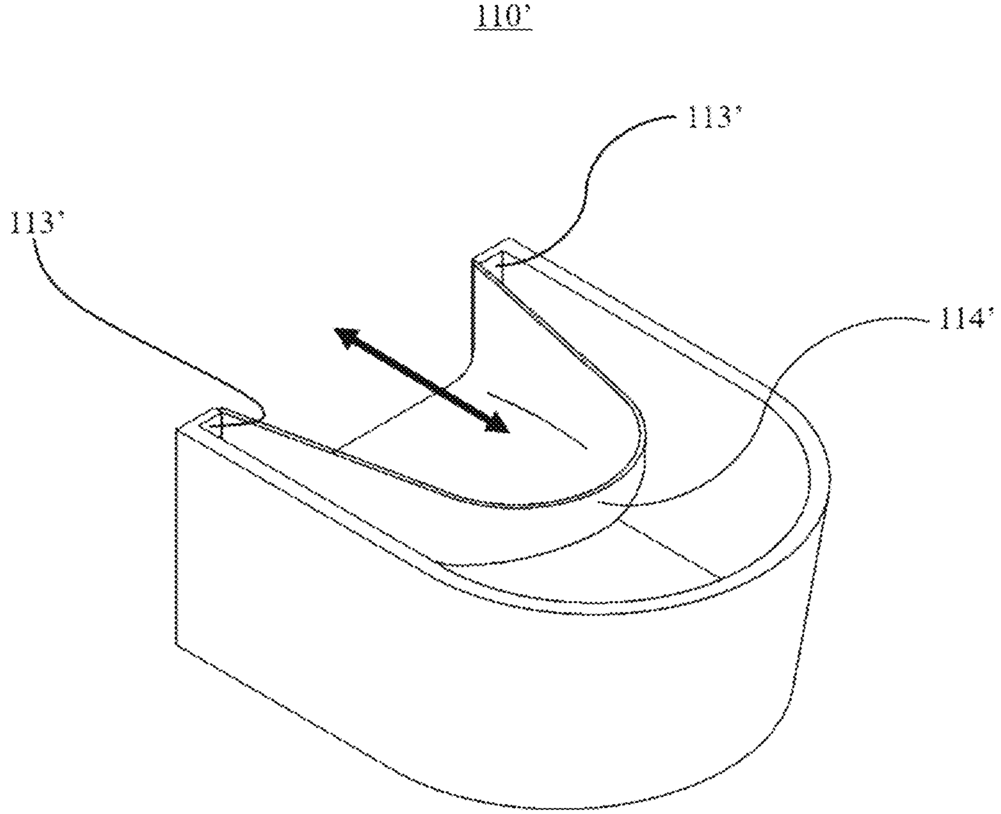

The variable wall body 114' illustrated in FIGS. 6 and 7 may be made of a latex rubber material, for example, and may be elastically deformed. In this case, a portion to which the variable wall body 114' is connected is airtightly processed so that water does not leak although a user performs foot washing and a foot bath by using the foot washing tank 110'.

Figure 8:
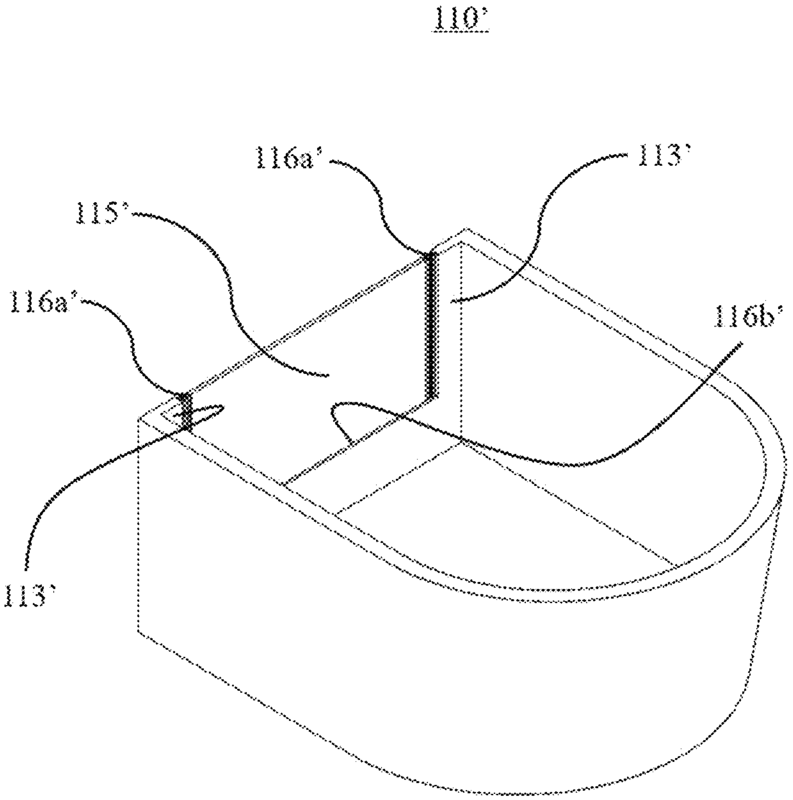
Figure 9:
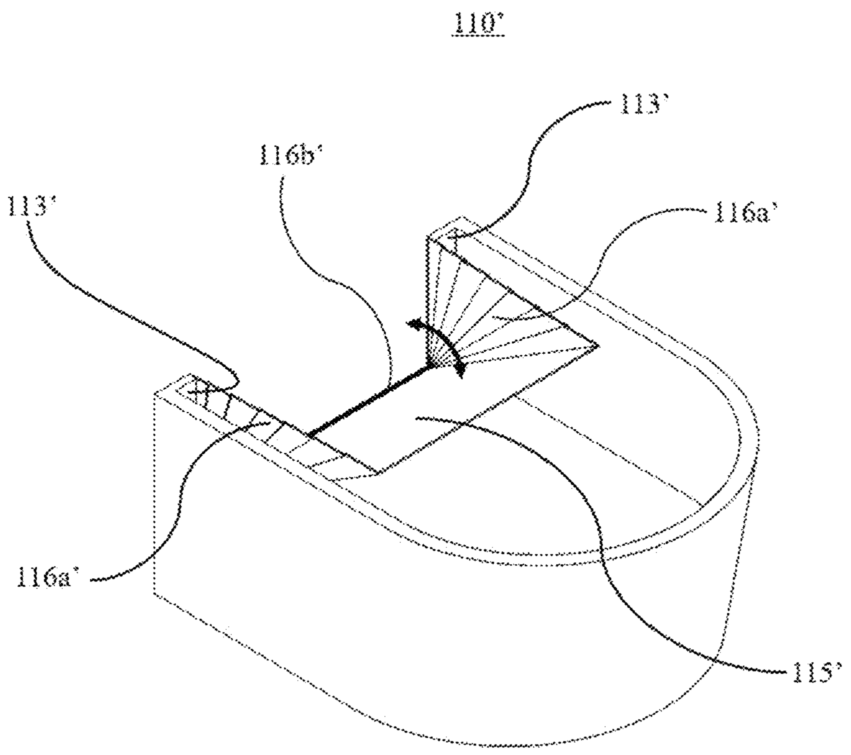

As another example, methods illustrated in FIGS. 8 and 9 are described.

In this embodiment, the inner wall of the foot washing tank 110' includes the fixing wall body 113' and a variable wall body 115', and a connection part **116*a*', 116*b*' that connects the fixing wall body 113' and the variable wall body 115' and seals a connection portion of the fixing wall body 113' and the variable wall body 115' so that water does not leak. The fixing wall body 113' has a space that is molded along with the foot washing tank 110' and at a central part of which the variable wall body 115' will be disposed. The connection part 116*a*', 116*b*' are used when the variable wall body 115' and the fixing wall body 113' are combined. Three surfaces of the variable wall body 115' except the top thereof are combined with the fixing wall body 113' by using the connection part 116*a*', 116*b*'. Accordingly, when being combined by using the connection part 116*a*', 116*b*', the variable wall body 115' and the fixing wall body 113'** are maintained as a wall body having a rectangular shape when viewed on a plane.

However, when the foot washing tank 110' is disposed in the receiving part of the main body (200' in FIG. 5), the variable wall body 115' is rotated or dragged into the foot washing tank 110' along a shape of the bottom 212' of the toilet tank of the main body. The connection part **116*a*', 116*b*'** needs to be deformable by incorporating the rotation or dragging of the variable wall body.

Accordingly, a suitable material for the connection part **116*a*', 116*b*' is synthetic rubber, such as latex, which enables a portion 116*a*' that connects the left and right of the variable wall body 115' to be elastically deformed and enables a portion 116*b*' that connects the lower side of the variable wall body 115'** to be folded.

As a modified embodiment, in order to further increase the degree of deformation, the connection part 116' may be constructed to have a form that has been wrinkled and processed. If the wrinkled connection part 116' is adopted, the left and right of the connection part **116*a*', 116*b*' may have a form in which the left and right are usually folded as illustrated in FIG. 9 and are unfolded when the foot washing tank is inserted into the toilet so that the variable wall body 115'** is rotated and inclined into an inner space of the foot washing tank.

Meanwhile, the variable wall body 114', 115' in FIGS. 6 to 9 may be constructed in a way (not illustrated) that the variable wall body is adjusted to be moved up and down in some section of the inner wall of the foot washing tank 110'. The variable wall body 114', 115' may be automatically adjusted to be moved up and down depending on a location of the foot washing tank 110', or a user may manually move the location of the foot washing tank 110' up and down by using a separate switch. In this case, an important thing is that the variable wall body 114', 115' has a sealing structure in which water does not leak to the outside when a user uses the foot washing tank 110' and performs foot washing or a foot bath.

As a result, the variable wall body 114', 115' needs to be adjusted so that the height thereof is lowered when the foot washing tank 110' is inserted into the front part of the sitting toilet (10 in FIG. 4) on the lower side thereof. When a user slides the foot health care device (100 in FIG. 4) forward from the sitting toilet (10 in FIG. 4) in order to use the foot health care device, the location of the variable wall body 114', 115' needs to be adjusted so that the height thereof is increased.

Figure 10:
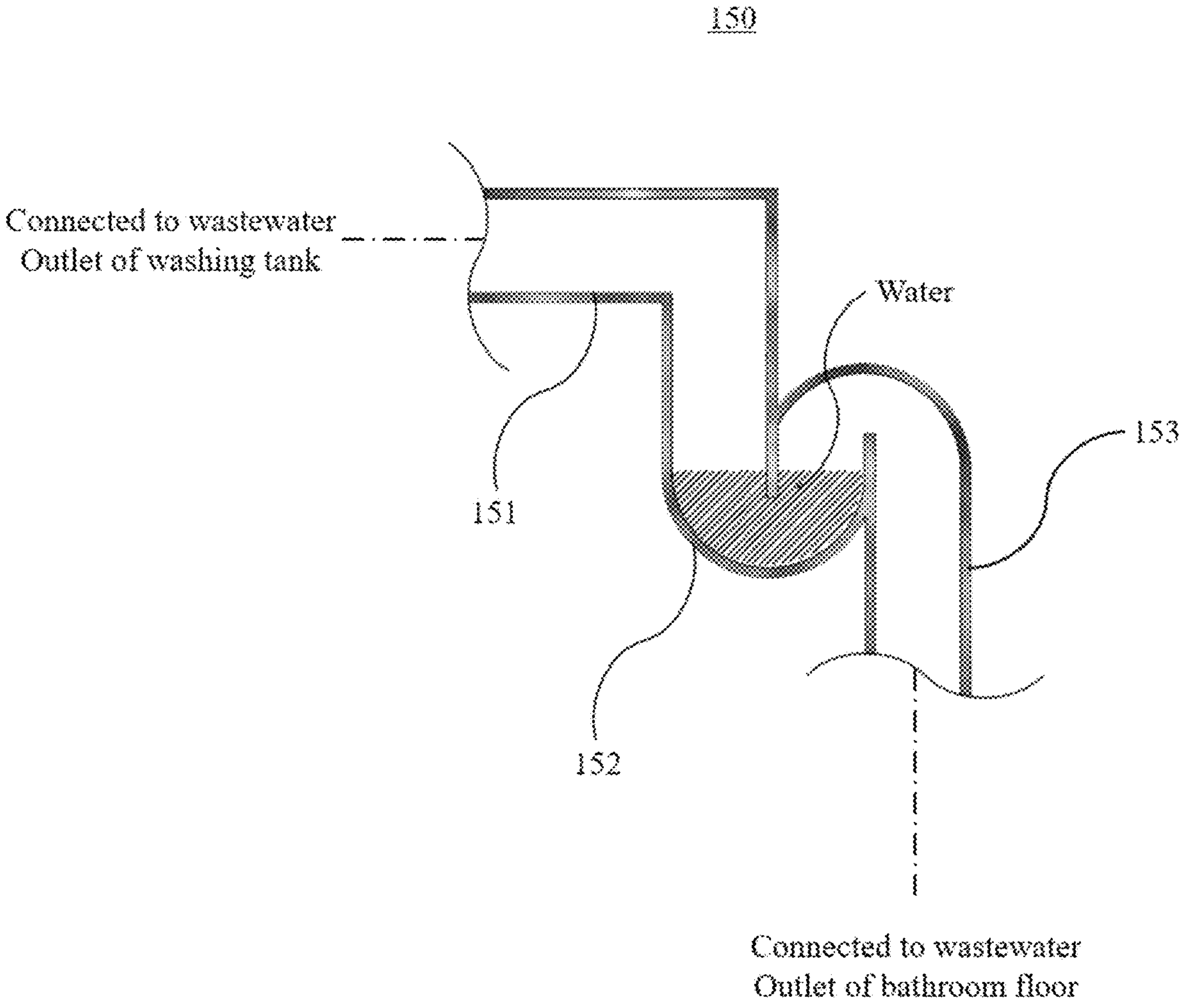
FIG. 10 is a cross-sectional view schematically illustrating a wastewater discharge unit of the foot health care device according to an embodiment of the present disclosure.

FIG. 10 is a cross-sectional view schematically illustrating a wastewater discharge unit of the foot health care device according to an embodiment of the present disclosure.

A wastewater discharge unit 150 illustrated in FIG. 10 includes a wastewater inflow pipe 151, a smell blocking unit 152, and a wastewater discharge pipe 153.

The wastewater inflow pipe 151 (a horizontal pipe at the front end of a U-shaped pipe) is connected to the wastewater outlet of the foot washing tank (110 in FIGS. 2 and 110' in FIG. 3), and penetrates a connecting hole (not illustrated) of the main body (200 in FIGS. 1 and 2, 200' in FIG. 3). In this case, the connecting hole is a hole through which the wastewater inflow pipe 151 can pass. Such a connecting hole may be formed in a section in which the wastewater discharge unit 150 is connected to the main body (200 in FIGS. 1 and 2, 200' in FIG. 3).

The smell blocking unit 152 (the U-shaped pipe) is disposed between the wastewater inflow pipe 151 and the wastewater discharge pipe 153, and blocks the inflow of smell from the wastewater outlet of the bathroom floor. To this end, the smell blocking unit 152 may be implemented by using a U-shaped pipe or a dedicated valve in order to block the inflow of stink from the wastewater outlet of a bathroom floor.

The wastewater discharge pipe 153 (a vertical pipe at the rear end of the U-shaped pipe) has a front end connected to the smell blocking unit 152, and has a rear end connected to the wastewater outlet of the bathroom floor.

In this case, the wastewater discharge unit 150 may be formed as an assembly in which the wastewater inflow pipe 151, the smell blocking unit 152, and the wastewater discharge pipe 153 are formed of separate parts, or the separate parts may be combined into one and integrally formed in the wastewater duct 201 of the main body 200.

Meanwhile, the wastewater discharge unit 150 may be included and implemented in a flange (not illustrated) that is used when the wastewater duct of the sitting toilet (10 in FIGS. 1 to 3) is combined with the wastewater outlet of a bathroom floor. For example, the wastewater discharge unit 150 may be implemented in an eccentric flange by deforming the eccentric flange so that the wastewater of the foot washing tank (110 in FIGS. 2 and 110' in FIG. 3) can be discharged.

The foot health care device (100 in FIGS. 1 and 2, 100' in FIG. 3) fills the smell blocking unit 152 with water by periodically discharging clean water. This is for preventing wastewater from staying in the smell blocking unit 152 having the U-shaped form. It is better than the peripherals of the smell blocking unit 152 maintain an airtight state.

Figure 11:
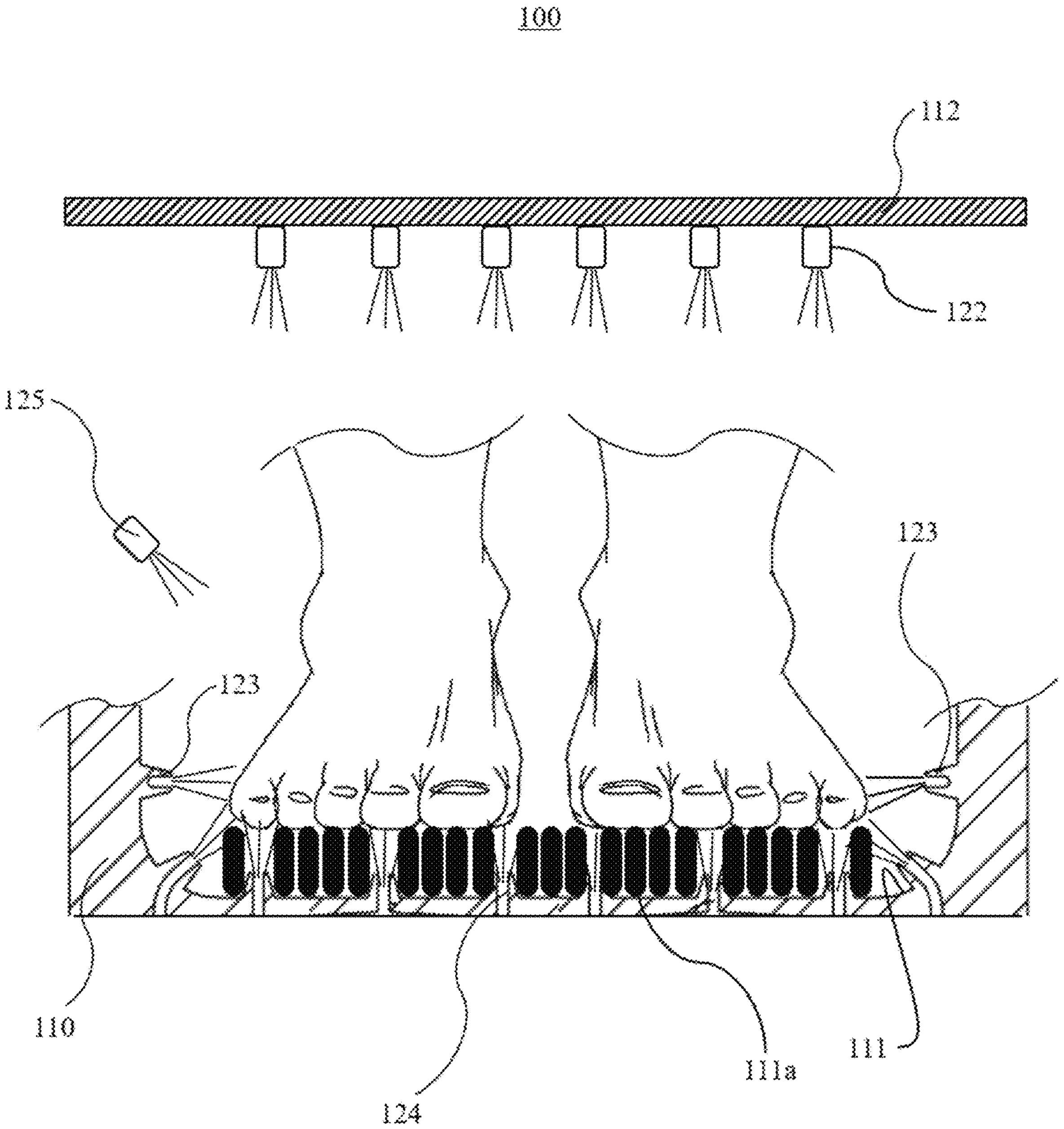
FIG. 11 is a cross-sectional exemplary view schematically illustrating an example of an operation of the foot health care device, from the front of the sitting toilet, in the sitting toilet having the foot health care device attached thereto according to an embodiment of the present disclosure.
Figure 12:
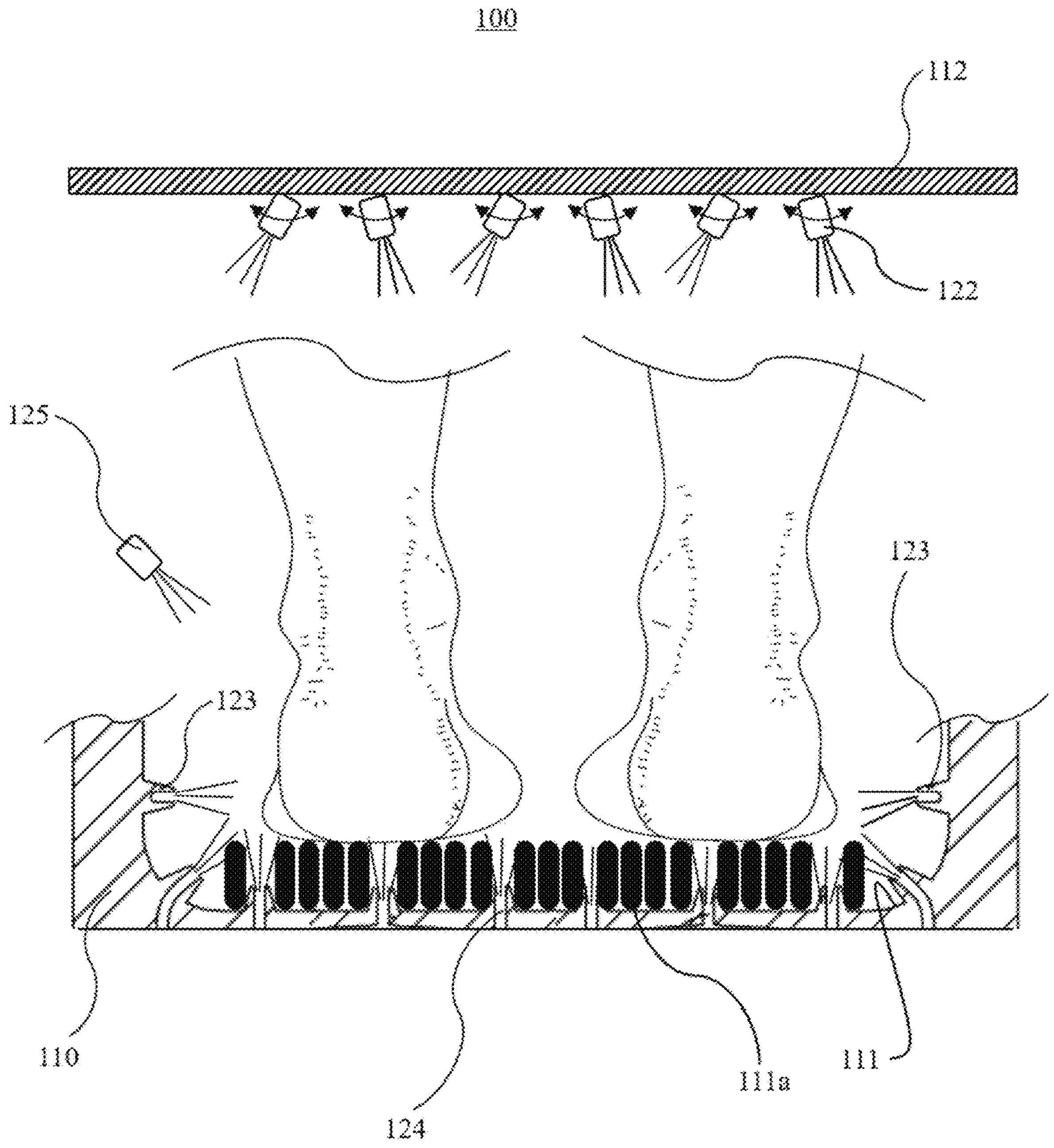
FIG. 12 is a cross-sectional exemplary view schematically illustrating an example of an operation of the foot health care device, from the back of the sitting toilet, in the sitting toilet having the foot health care device attached thereto according to an embodiment of the present disclosure.

FIGS. 11 and 12 are cross-sectional exemplary views schematically illustrating an example of an operation of the foot health care device according to an embodiment of the present disclosure from the front and rear of the foot health care device.

Referring to both FIGS. 11 and 12, the foot washing tank 110 has a structure in which the feet of a user are received therein. A washing plate 111 in which the feet of the user are placed is provided at the base plate of the foot washing tank 110.

The washing plate 111 is basically a plane, but may be deformed to include a central part (a portion at which the arch of a foot is placed) that upward protrudes.

A plurality of bumps 111*a* that upward protrude may be disposed in the washing plate 111 at intervals.

The bump 111*a* functions to help effectively wash the sole of a foot or to maintain a predetermined distance between a floor or a nozzle (an upward spray nozzle 124) that is formed at the bottom of the washing plate 111 and the foot. It is preferred that the bump 111*a* has a form that makes the sole feel a rough touch when the sole touches the bump, thus providing an acupressure effect, and that simultaneously allows the foot to be scrubbed.

Meanwhile, portions of the bumps 111*a* at which the foot is placed play a role as a frame that is elastically deformed or downward depressed to hold a shape of the foot, so that the foot can be stably seated in the washing plate 111.

The washing plate 111 has a structure in which the washing plate is detachable from the foot washing tank 110, and may be constructed to be replaced and used. Alternatively, unlike in the structure, the bumps are formed on the bottom surface of the foot washing tank 110, and thus the washing plate may be an area in which the foot is placed, that is, an area corresponding to the entire bottom surface of the foot washing tank 110 or a part of the bottom surface of the foot washing tank 110.

The foot washing tank cover 112 provides an area that prevents water from being splashed out by covering some section (front part) of the top of the foot washing tank 110 and in which downward spray nozzles 122 to be described later are installed.

The foot washing tank cover 112 may have a structure detachable from the foot washing tank 110, and may have a structure in which a hinge shaft (not illustrated) is rotatable by being connected to one side of the foot washing tank 110 at the front end thereof.

The spray unit 120 sprays washing water toward the inner space of the foot washing tank 110. The washing water is basically water, but may include a cleaning solution.

The spray unit 120 includes a side spray nozzle 123 and an upward spray nozzle 124, and may selectively include the downward spray nozzle 122 that is formed at the bottom of the foot washing tank cover 112.

One or more side spray nozzles 123 are disposed in the inner circumferential surface of the foot washing tank 110, and spray water laterally. Such a side spray nozzle 123 sprays water to a location that is lower than a horizontal direction at a location at which the side spray nozzle is installed on the inner wall of the foot washing tank 110.

The washing water is sprayed from the left and right inside the foot washing tank 110, so that the sole of a foot can be washed by twisting the ankle.

Meanwhile, the front end of the bottom of the foot washing tank 110 may be formed to be higher than the height of the rear end thereof, and the location of the side spray nozzle 123 toward the toes of a foot may be formed to be higher. In this case, the top of a foot and the toes of the foot can be more effectively washed because the direction of sprayed washing water becomes more perpendicular.

The upward spray nozzles 124 are disposed in the bottom surface of the washing plate 111 at an interval, and wash the sole of a foot by spraying water upward.

In this case, in relation to spray pressure of the upward spray nozzle 124, it is preferred that the height of the sprayed washing water is maintained within the height of the foot washing tank 110 in order to prevent the washing water from being splashed out of the foot washing tank 110. Alternatively, spray pressure of the upward spray nozzle 124 may be adjusted to be strong when the sole is washed, and the spray pressure may be adjusted to become weak immediately when it is detected that the foot is detached from the washing plate.

One or more downward spray nozzles 122 are disposed inside the cover (112 in FIG. 3), and spray washing water downward. If the downward spray nozzle 122 is additionally provided, it is effective to wash the top and toes of a foot.

A separate washing water supply unit (160 in FIG. 15) and/or a cleaning solution supply unit (not illustrated) that are disposed outside are connected to the spray unit 120. The supply of washing water is performed through an external water supply pipe. However, a water reservoir (not illustrated) for storing the washing water may be provided within the foot washing tank 110 in order to adjust spray pressure of the washing water. For example, when water pressure of the water supply pipe is higher than required water pressure, the water reservoir maintains proper spray pressure by playing a role as a buffer. If spray pressure of the washing water needs to be higher than water pressure of the water supply pipe, a piston (not illustrated) connected to the water reservoir operates to raise the spray pressure.

The cleaning solution supply unit may be supplied with a cleaning solution from an external cleaning solution supply device (not illustrated) or may be constructed in a cartridge replacement type. The cleaning solution supply unit is connected to a cleaning solution nozzle 125. As another embodiment, the cleaning solution supply unit may be connected to all of the nozzles of the spray unit 120 so that the nozzles of the spray unit 120 alternately spray washing water and a cleaning solution or mix and spray the washing water and the cleaning solution.

That is, the downward spray nozzle 122, the side spray nozzle 123, the upward spray nozzle 124, and the cleaning solution nozzle 125 may be connected by one pipe, and a spray valve (not illustrated) may be provided at each branched portion of the pipe, so that the washing water and/or the cleaning solution are selectively sprayed.

Alternatively, for convenience of a structure, only the downward spray nozzle 122 and the cleaning solution nozzle 125 may be connected by one pipe, and the spray valve may be disposed between the downward spray nozzle 122 and the cleaning solution nozzle 125, so that the washing water and/or the cleaning solution are selectively sprayed.

An operation of the spray unit 120 is controlled by the control unit (140 in FIG. 3) in response to a user input through the user input unit (130 in FIG. 3) or according to predetermined control logic.

In this case, it is preferred that in order to prevent water from being splashed out of the foot washing tank 110, the spray unit 120 sprays water in the state in which the foot washing tank 110 has been filled with a preset amount of water. In this case, the preset amount may be measured as a height that is preset by a user and at which the foot washing tank 110 is filled with washing water. The setting of the preset amount may be changed depending on an environment.

Spray pressure, a spray pattern, and a spray angle of the washing water and/or the cleaning solution that is sprayed by the spray unit 120 may be variously combined or controlled, and are described later.

The ON/OFF of power of the spray unit 120 may be differently displayed by an LED (not illustrated) that is electrically connected to the user input unit (130 in FIGS. 2 and 3).

Figure 13:
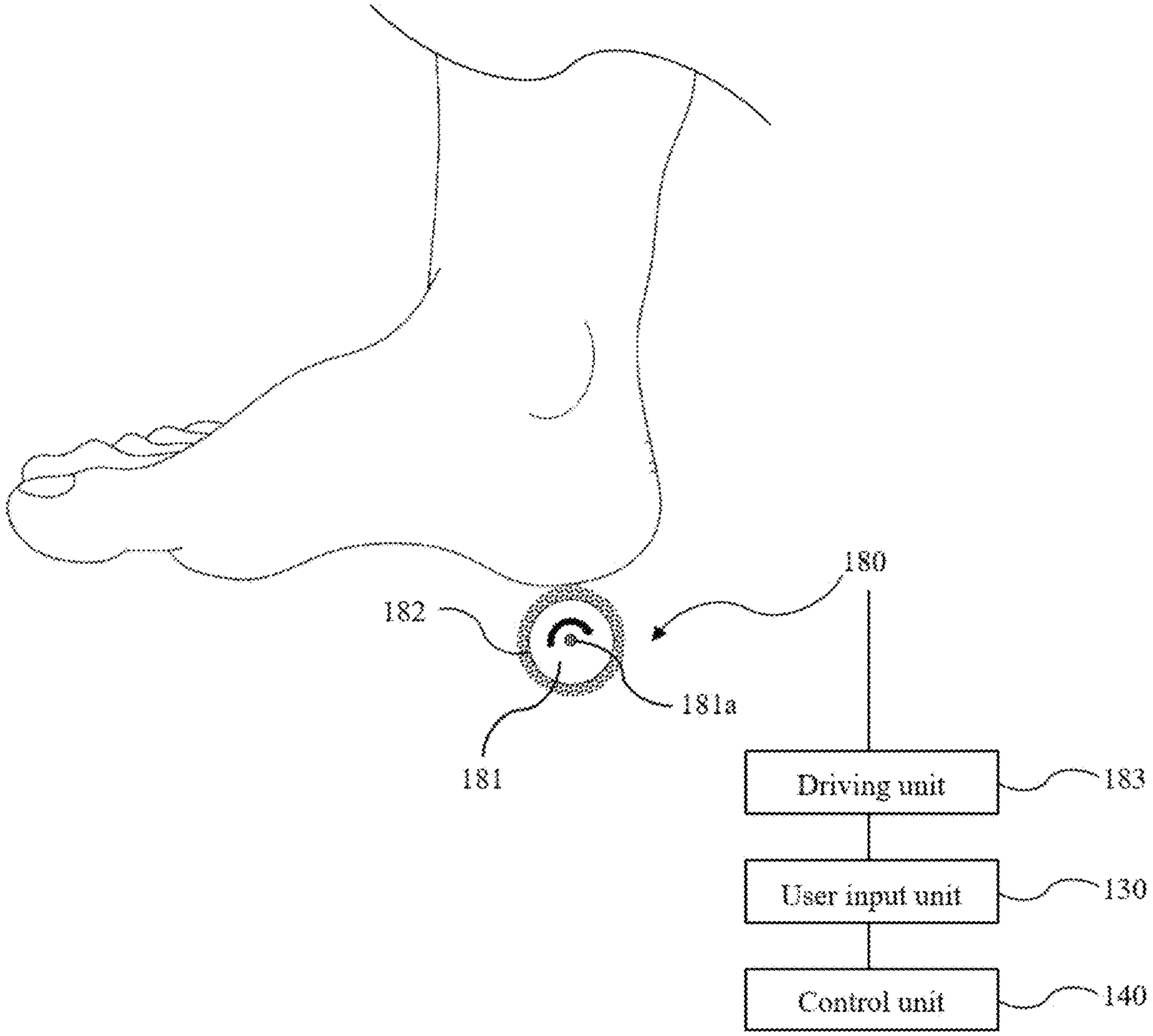
FIG. 13 is a diagram schematically illustrating an example of an operation of a heel washing unit in the sitting toilet having the foot health care device attached thereto according to an embodiment of the present disclosure.

FIG. 13 is a diagram schematically illustrating an example of an operation of a heel washing unit in the sitting toilet having the foot health care device attached thereto according to an embodiment of the present disclosure.

Referring to FIG. 13, the foot health care device (100 in FIGS. 1 to 12) according to the present disclosure may further include a heel washing unit 180.

The heel washing unit 180 is rotatably installed at the rear end (a portion at which the heel of a foot is placed) of the foot health care device 100, and functions to well wash the heel or remove dead skin cells of the heel. The heel washing unit 180 may be disposed to have a predetermined inclination along a shape of the heel.

The heel washing unit 180 includes a rotation member 181, a brush 182, and a driving unit 183.

The rotation member 181 has a structure in which the rotation member is rotatably connected to the rear end of the foot washing tank (110 in FIGS. 1 to 12) within the foot washing tank in a width direction or length direction thereof. The rotation member 181 has rotation pins 181*a* at both ends of the rotation member in a length direction thereof.

The brush 182 is a portion that directly touches a part between the toes of a user, and has a structure that surrounds the rotation member 181. An external surface of the brush 182 has a rough surface, and can effectively remove a polluted material (dead skin cells, etc.) between the toes. For convenience of washing, it is better that the brush 182 has a structure detachable from the rotation member 181.

When a command signal of the user input unit 130 that has been manipulated by a user is transmitted to the control unit 140, the driving unit 183 may rotate the rotation member 181 by the control unit 140.

Figure 14:
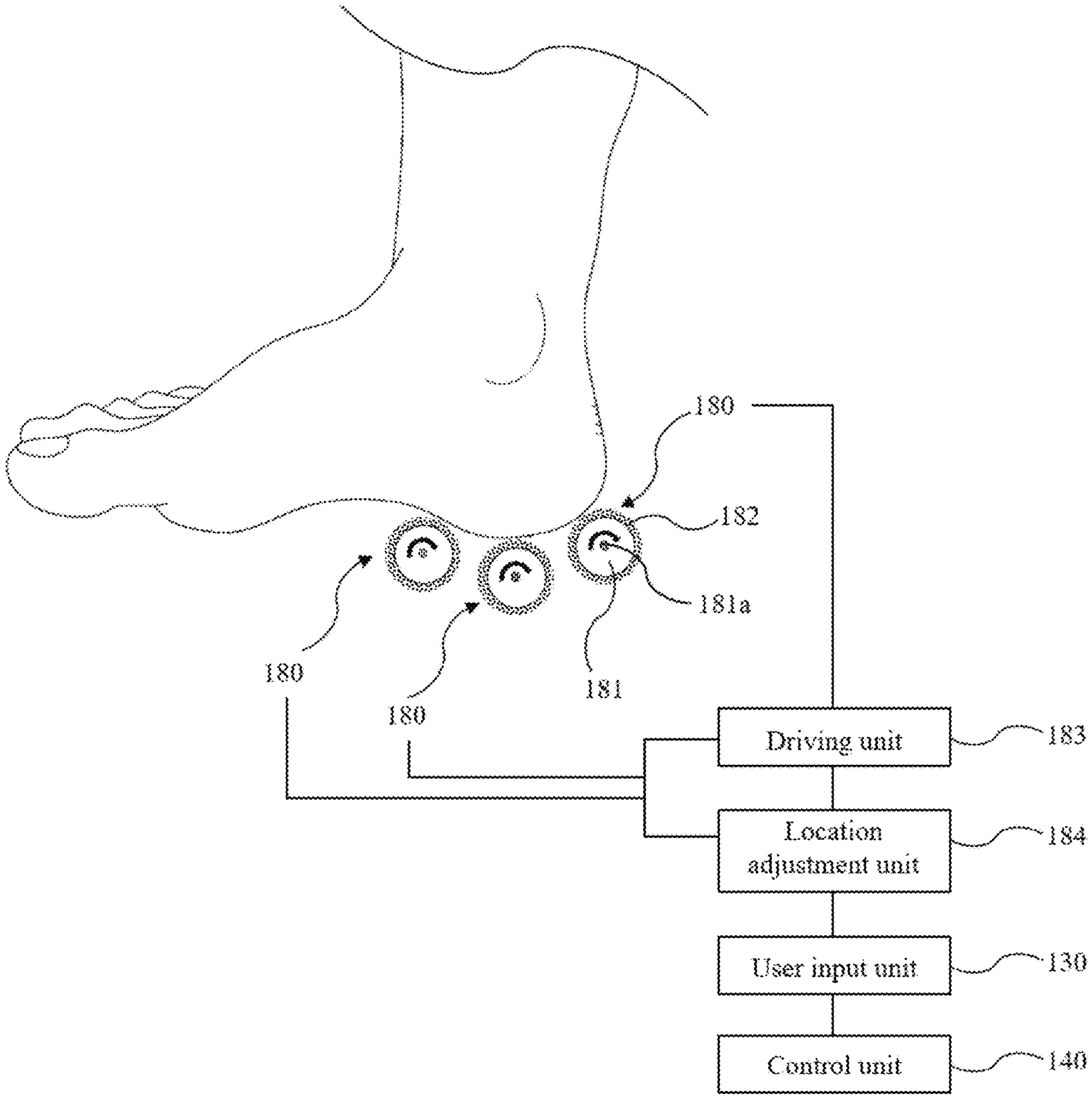
FIG. 14 is a diagram schematically illustrating a modified example of an operation of the heel washing unit in the sitting toilet having the foot health care device attached thereto according to an embodiment of the present disclosure.

FIG. 14 is a diagram schematically illustrating a modified example of an operation of the heel washing unit in the sitting toilet having the foot health care device attached thereto according to an embodiment of the present disclosure.

Referring to FIG. 14, the heel washing unit 180 may be disposed to be inclined at a predetermined angle along a shape of the heel of a foot. Three heel washing units 180 may be constructed to surround the heel.

In this case, the locations of the heel washing units 180 may be adjusted in a horizontal and vertical direction through a location adjustment unit 184. In addition, a driving mechanism among the driving unit 183, the user input unit 130, and the control unit 140 is omitted because the driving mechanism is the same as that in FIG. 13.

Meanwhile, as an example of another construction of the heel washing unit 180, one rotation shaft may be constructed to wash the heel and/or ball of a foot while laterally moving in a direction perpendicular to the direction in which the rotation shaft is disposed.

Both the heel washing unit 180 and the washing plate (111 in FIGS. 11 and 12) are disposed at the base (bottom) of the foot washing tank (110 in FIGS. 1 to 12). Accordingly, it is preferred that in order to reduce or remove mutual mechanical interference, the size of the washing plate 111 is reduced and the heel washing unit 180 and the washing plate 111 are spaced apart from each other at a predetermined interval and installed in the remaining space.

As another embodiment, in addition to the heel washing unit 180, a ball-of-foot washing unit (not illustrated) may be further installed at the front end of the foot health care device (100 in FIGS. 1 to 12). The ball-of-foot washing unit has a function for washing and massaging the ball of a foot, which corresponds to a portion between the arch and toes of the foot, and a detailed structure thereof is constructed substantially identically with the heel washing unit.

Additionally, the foot health care device 100 according to the present disclosure may include a heating unit (not illustrated) for heating washing water. The heating unit heats washing water before the washing water is sprayed by using a method, such as a water heater or an electric heater, so that warm washing water is sprayed.

Figure 15:
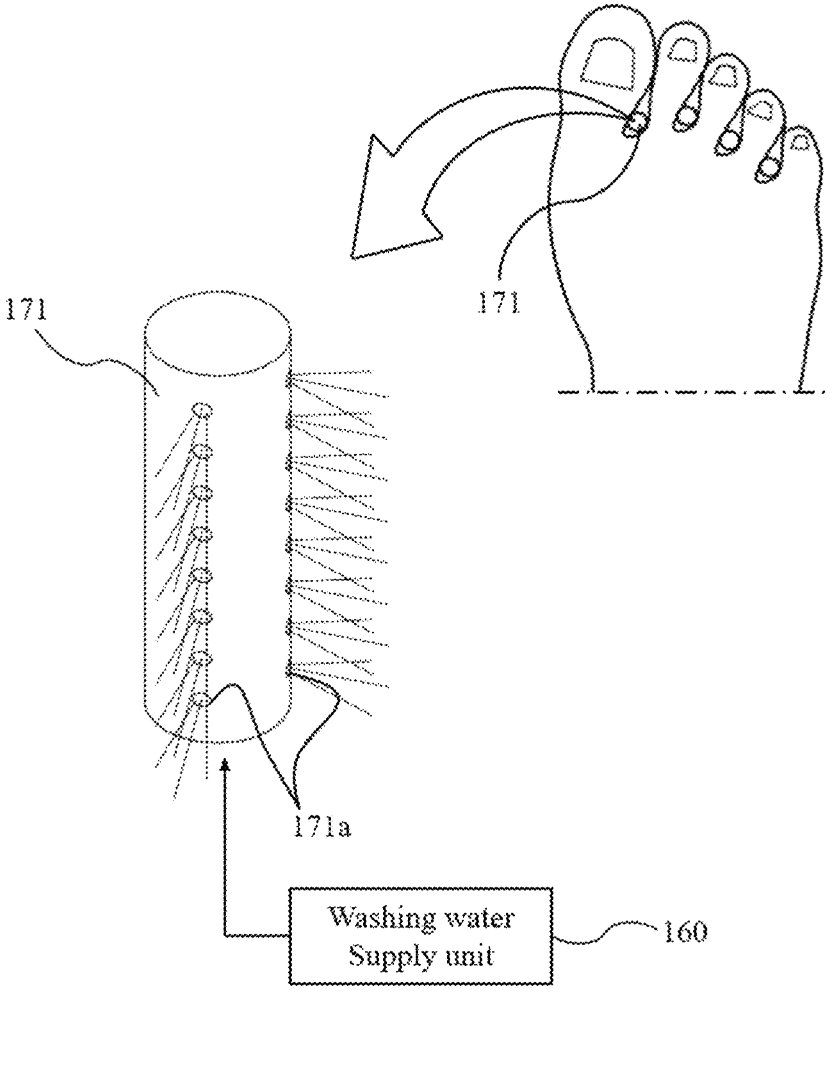
FIG. 15 is a diagram schematically illustrating a toe spray nozzle in the sitting toilet having the foot health care device attached thereto according to an embodiment of the present disclosure.

FIG. 15 is a diagram schematically illustrating a toe spray nozzle in the sitting toilet having the foot health care device attached thereto according to an embodiment of the present disclosure.

Referring to FIG. 15, a toe spray nozzle 171 may be further disposed in the foot health care device.

The toe spray nozzles 171 are disposed at intervals in the width direction of the washing plate 111 so that the toe spray nozzle is disposed between the toes of a foot, which are seated in the washing plate (111 in FIGS. 11 and 12) in a length direction thereof, and spray water between the toes.

The toe spray nozzle 171 is disposed between the toes, and may be constructed in a form in which the width between the toe spray nozzles is adjusted left and right or the length of the toe spray nozzle is adjusted up and down on the basis of toes illustrated in FIG. 15.

The toe spray nozzle 171 has a cylindrical shape, and has a plurality of spray holes 171*a* on an external surface thereof. The toe spray nozzle 171 is connected to the washing water supply unit 160, and has a function for spraying washing water to the outside. The washing water that is supplied by the washing water supply unit 160 is sprayed to the outside (between the toes of a user) through the plurality of spray holes 171*a*.

The toe spray nozzle 171 has a column shape as illustrated, but the toe spray nozzle 171 has a taper shape the width of a part of the top of which is widened from an upper part to a lower part thereof, and may have a structure which can be easily inserted between toes.

The toe spray nozzle 171 may have a structure which can be moved and adjusted up and down and can spray water while rotating.

A person who uses the foot health care device 100 according to the present disclosure has different shapes and sizes of toes. The location of the toe spray nozzle 171 may be moved by a predetermined length (an installation interval) in the width (and/or length) direction of the washing plate 111 depending on a shape of a toe of a user so that the toe spray nozzle can be applied to unspecified individuals.

A location movement of the toe spray nozzle 171 for each user is stored in a memory device (not illustrated) so that the toe spray nozzle can be moved to a location that has been stored for each user by a simple manipulation of the user input unit (130 in FIGS. 2 and 3) subsequently. For example, this may correspond to an example in which if two persons A and B who have different toe sizes and shapes use the foot health care device 100, the person A may manipulate the user input unit (e.g., press a No. 1 button) so that the toe spray nozzle 171 is automatically moved to a location suitable for a toe of the person A and the person B may manipulate the user input unit (e.g., press a No. 2 button) so that the toe spray nozzle 171 is automatically moved to a location suitable for a toe of the person B.

Hereinafter, an operation and control of the foot health care device (100 in FIGS. 1 to 12) according to the present disclosure are described. An overall operation of an electrical/electronic device of the foot health care device 100 according to the present disclosure, including the spray unit 120, the cleaning solution nozzle 125, and the user input unit (130 in FIGS. 2 and 3), is controlled by the control unit (not illustrated).

First, control of spray pressure and a spray operation is described in detail.

The foot health care device 100 according to the present disclosure may be controlled so that the spray nozzles sequentially perform a spray in order to maintain spray pressure of each spray nozzle at a given level or higher. For example, the foot health care device is controlled so that the upward spray nozzle 124, the side spray nozzle 123, and the toe spray nozzle 171 sequentially operate in order to maintain spray pressure at a given level or higher. If necessary, a booster pump (not illustrated) for raising spray pressure may be used. If proper spray pressure can be maintained, the foot health care device may be controlled so that two or more nozzles simultaneously perform a spray.

Meanwhile, in order to increase a washing massage effect, the foot health care device may be controlled so that each nozzle performs a spray at varying spray pressure over time.

A method of spraying washing water and a cleaning solution may have various combinations. For example, upon spray of washing water by the spray unit 120, the spray unit 120 may be constructed to spray water and a cleaning solution alternately or according to a predetermined spray pattern through the same nozzle, to spray washing water in which water and a cleaning solution are mixed, or to spray only water. Alternatively, the cleaning solution may be controlled to be sprayed by only a dedicated nozzle (the cleaning solution nozzle 125).

In order to increase a washing effect and a massage effect, the spray angle of each nozzle of the spray unit 120 may be adjusted left/right or up/down. It is preferred that the spray angles of the side spray nozzle 123 and the upward spray nozzle 124 are limited in a predetermined range so that water is not splashed out of the foot washing tank 110.

Control of spray pressure, a spray method, and a spray angle is performed by the control unit (140 in FIGS. 2 and 3) according to a user manipulation through the user input unit (130 in FIGS. 2 and 3) or preset control logic.

Figure 16:
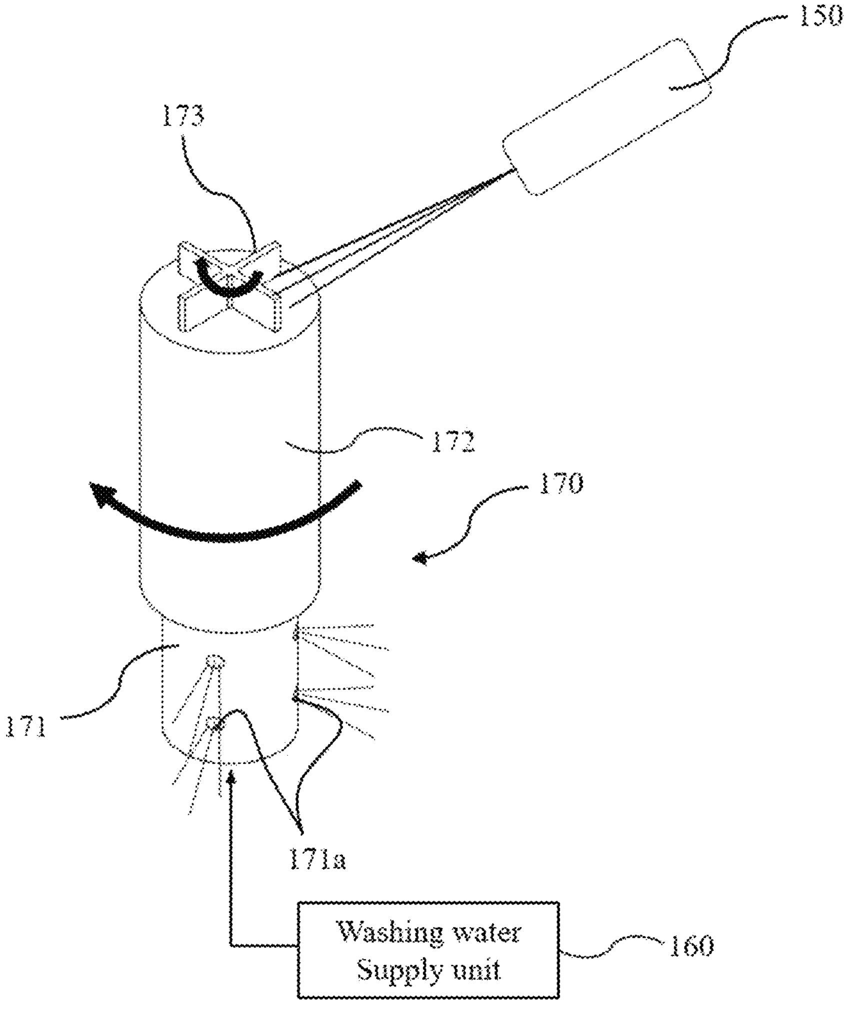
FIG. 16 is a diagram schematically illustrating an example of an operation of a toe washing unit in the sitting toilet having the foot health care device attached thereto according to an embodiment of the present disclosure.

FIG. 16 is a diagram schematically illustrating an example of an operation of a toe washing unit in the sitting toilet having the foot health care device attached thereto according to an embodiment of the present disclosure.

Referring to FIG. 16, a toe washing unit 170 includes the toe spray nozzle 171, a washing member 172, and a rotation piece 173.

The washing member 172 may be rotatably mounted on the top of the toe spray nozzle 171. The washing member 172 has a cylindrical shape the bottom of which is opened. The rotation piece 173 is disposed at the top of the washing member 172, and may be coaxially rotated along with the washing member 172.

In the toe washing unit 170, the washing member 172 combined with the rotation piece 173 covers a part of the top of the toe spray nozzle 171, and washes between toes while rotating in an axial direction. That is, the washing member 172 has a structure in which the washing member is rotated while operating in conjunction with the rotation piece 173, when the rotation piece 173 is rotated by washing water that is sprayed by the spray unit 120.

The washing member 172 is a portion that directly touches the skin in order to remove an alien substance, including various types of dead skin cells, etc., between the toes. Accordingly, the washing member may have a rubber type that is produced by blowing an undiluted solution of natural rubber, or may be made of a hard sponge consisting of a urethane type that is made of synthetic resin. A plurality of bumps may be formed in an outer circumference surface of the washing member 172 at intervals.

In this case, a bearing (not illustrated) that assists the rotation of the washing member 172 may be provided between an inner circumferential surface of the washing member 172 and an outer circumference surface of the toe spray nozzle 171.

FIGS. 17 to 20 are diagrams schematically illustrating modified examples of an operation of the toe washing unit in the sitting toilet having the foot health care device attached thereto according to an embodiment of the present disclosure.

A washing member 172' illustrated in FIGS. 17 to 20 has a cylindrical shape the bottom of which is opened, and may be rotated in an axial direction thereof in the state in which the washing member has surrounded the outside of a toe spray nozzle 171'. However, the washing member 172' in FIGS. 17 to 20 has a rotation method different from that of the aforementioned embodiment.

Prior to a description of the rotation method, structures of the toe spray nozzle 171' and the washing member 172' are described.

Figure 18:
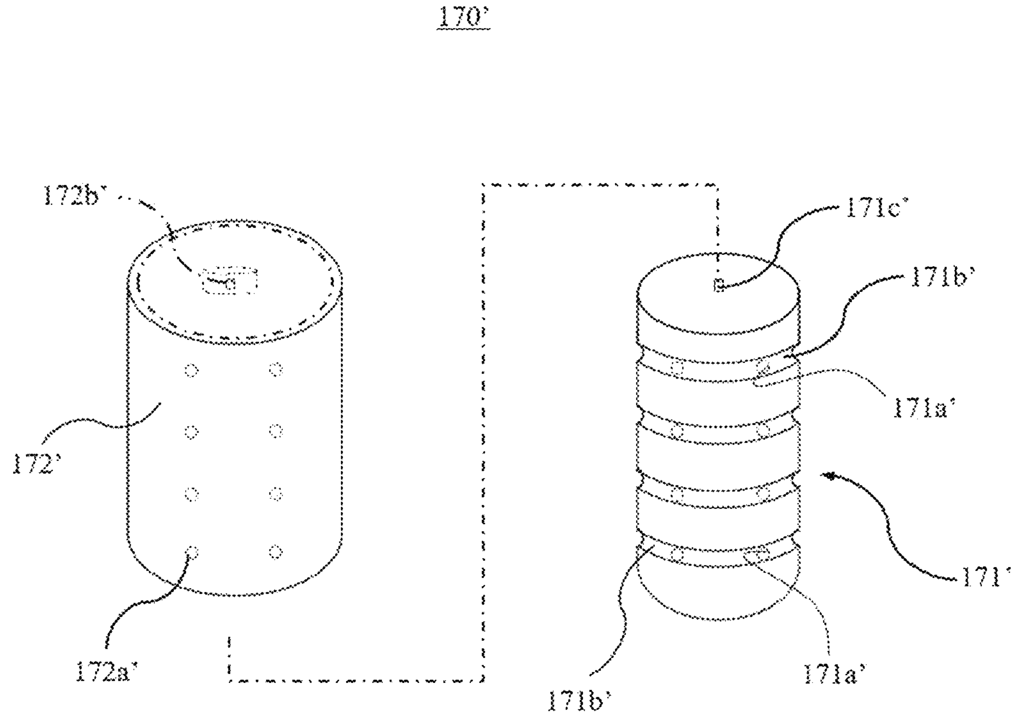

As illustrated in FIG. 18, the toe spray nozzle 171' has a structure in which the toe spray nozzle can be rotated in the state in which the toe spray nozzle has been inserted into the washing member 172'.

To this end, the toe spray nozzle 171' has a washing water guide groove **171*b*', a spray hole 171*a*', and a rotation shaft 171*c*'. The washing water guide grooves 171*b*' are depressed and formed at intervals on the outer circumferential surface of the toe spray nozzle 171' in a length direction thereof. The spray holes 171*a*' are formed in the washing water guide groove 171*b*' at intervals in a way to penetrate the washing water guide groove 171*b*'. The rotation shaft 171*c*' is connected to a rotation shaft connection groove 172*b*' that is formed on the inner surface of the washing member 172'**.

The washing member 172' has a plurality of spray holes **172*a*' that communicate with the spray holes 171*a*' of the toe spray nozzle 171'**.

Figure 17:
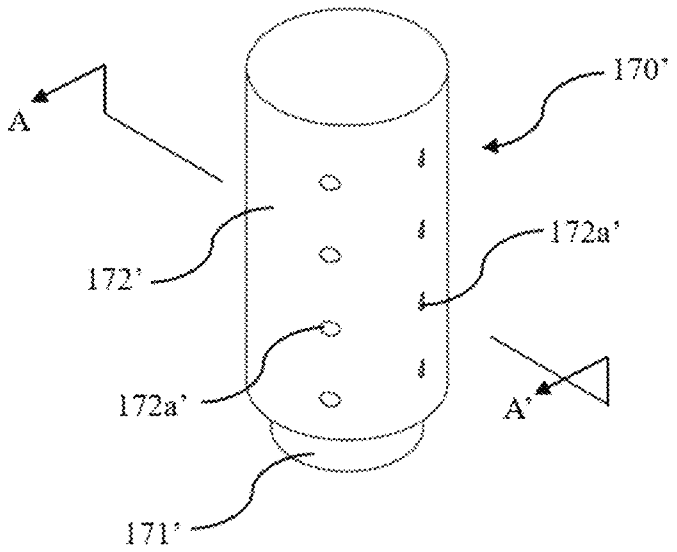
FIGS. 17 to 20 are diagrams schematically illustrating modified examples of an operation of the toe washing unit in the sitting toilet having the foot health care device attached thereto according to an embodiment of the present disclosure.
Figure 19:
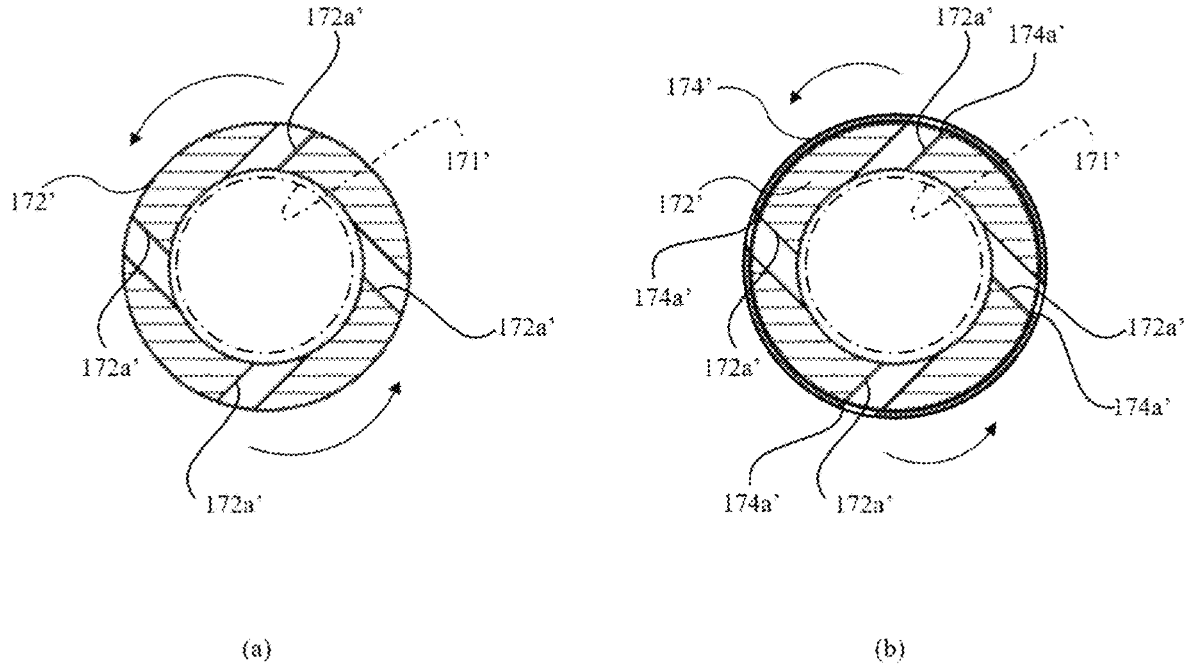

(a) of FIG. 19 is a diagram illustrating the cross section A-A' in FIG. 17, and (b) thereof is an example in which a washing member cover 174' has been added in (a). Referring to (a) and (b) of FIG. 19, the spray hole **172*a*' has a structure in which the spray hole is slantly penetrated on the basis of the shaft center of the washing member 172'**.

The spray hole **172*a*' of the washing member 172' has a structure in which the spray hole is connected to the washing water guide groove 171*b*' of the toe spray nozzle 171'**.

In this case, the washing water guide groove **171*b*' is a space through which water flows, and has a function for continuously spraying, to the outside, washing water that is input to the washing member 172' via the toe spray nozzle 171'** seamlessly.

Figure 20:
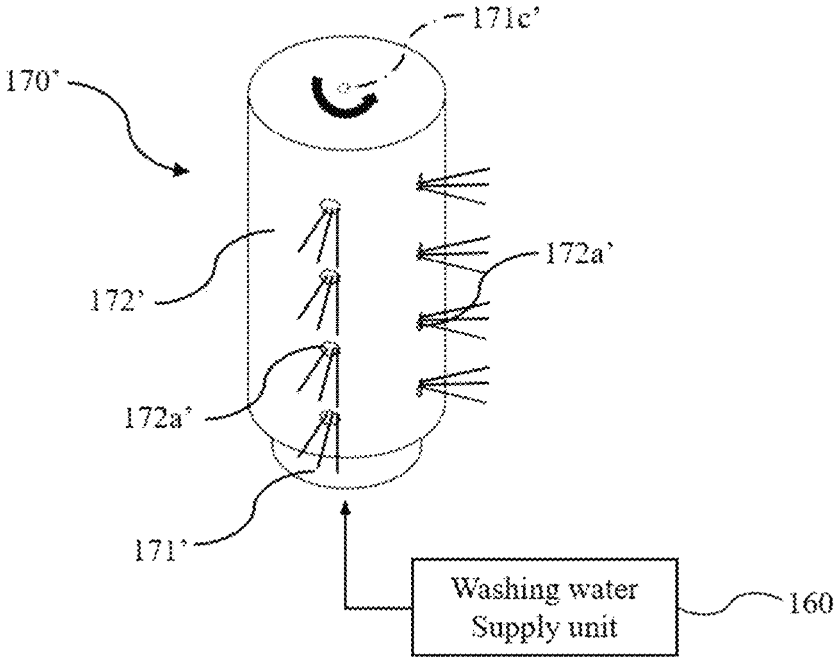

As illustrated in FIG. 20, when washing water supplied by the washing water supply unit 160 is sprayed to the spray hole **172*a*' via the spray hole 171*a*' of the toe spray nozzle 171', the spray hole 172*a*' induces the rotation of the washing member 172'** by its spray pressure.

The washing member 172' has a structure that is rotated by the force of washing water that is spouted through the spray hole **172*a*'. If the washing member 172' is made of a soft material, the washing member 172' may not be rotated between the toes of a user. Accordingly, the washing member 172'** is made of a hard material in a range in which the washing member can be rotated. A plurality of bumps may be formed in the outer surface of the washing member in order to assist washing.

The washing member cover 174' may be replaced with a shape that is inserted into the outer circumference surface of the washing member 172'. That is, the washing member cover 174' has a replacement type in order to maintain cleanliness because a contact surface of the washing member cover may be contaminated when a polluted material between the toes of a user is removed. In this case, it is preferred that a cover hole **174*a*' of the washing member cover 174' communicates with the spray hole 172*a*'**.

In the toe washing unit 170', the toe washing nozzle 171' is perpendicularly extended upward. One or more toe washing nozzles 171' are disposed every between toes of a user, and wash between the toes and massage the toes through its rotation.

It is better that one or more bumps are placed in the outer circumference surface of the washing member 172' that surrounds the toe washing nozzle 171' in order to increase cleaning power and a massage effect. It is better that the body itself of the washing member 172' is a hard material, but the bump is a soft material.

Hereinafter, a preferred embodiment of an automatic washing operation of the foot health care device 100 according to the present disclosure is described.

The automatic washing function may include a foot placement detection step, a cleaning solution spray step, and a foot washing step. The foot placement detection step is a step of detecting that a foot is placed in the washing plate 111. The cleaning solution spray step is a step of spraying, by the control unit, a cleaning solution, by receiving a location information value of a foot detected by a foot detection sensor (not illustrated) and driving the cleaning solution nozzle 125 of the spray unit 120. The foot washing step is a step of washing the foot by spraying water through a water spray nozzle unit when a first waiting time elapses after the cleaning solution is sprayed.

Optionally, a foot detachment detection step of detecting, by the foot detection sensor, that the foot has been detached from the washing plate 111 and an internal washing step of spraying, by the spray unit 120, washing water in order to wash an internal space of the foot washing tank 110 after a second waiting time elapses may be additionally constructed.

In this case, the first or second waiting time means a preset time in a corresponding process, and a corresponding time may be changed by a user.

A user may perform various pre-settings by using the user input unit (130 in FIGS. 2 and 3). A user may set basic values, such as spray pressure of the spray unit 120, the first waiting time and second waiting time of the automatic washing function, and the injection quantity of a cleaning solution.

The foot placement detection step is performed by the foot detection sensor.

The foot detection sensor may be implemented in a way to install a light-receiving unit (not illustrated) and a light-emitting unit (not illustrated) on inner walls of the foot washing tank 110 on the left and right thereof, or may be implemented by placing a pressure sensor at the bottom of the washing plate 111.

The foot detection sensor transmits, to the control unit, an information value obtained by detecting a location at which a foot approaches the washing plate 111 or a pressure value at which the foot has been seated in the washing plate 111. The control unit is electrically connected to the foot detection sensor, and compares and computes a preset reference value and the information value transmitted by the foot detection sensor. When a result value complies with a reference value, the control unit drives and controls the spray unit 120.

In the foot washing step, the control unit controls the spray unit 120 so that an inner reception space of the foot washing tank 110 is automatically washed for a preset time. In this case, the preset time is a time that is calculated based on statistical values that have been accumulated as various types of data. An initial setting value may be different depending on each function, and a setting value thereof may be determined by a user. In order to increase a foot washing effect, foot washing may be performed while automatically changing a method of spraying washing water and a cleaning solution, spray pressure, and a spray angle in response to a user input or according to preset logic.

The internal washing step is performed when a user who has finished foot washing pulls out the foot. When the foot being detached from the washing plate 111 is detected, the driving of the spray unit 120 is stopped by the control unit. The control unit controls the spray unit 120 to wash the inside of the foot washing tank 110 by using the automatic washing function.

In order to wash the inside of the foot health care device 100, the control unit sprays washing water toward the washing plate 111 for a preset time by adjusting a spray angle. The set time may be arbitrarily changed by a user. Alternatively, the degree of washing of the washing plate may be detected by using a contamination sensor (not illustrated), and a washing time for the washing plate may be changed until washing having a proper level is reached.

Washing water that is sprayed in the internal washing step may be a mixture of a cleaning solution having stronger cleaning power than washing water upon washing of a foot. To this end, a cleaning solution storage unit may be constructed to store a cleaning solution for washing plate washing, separately from a cleaning solution for foot washing.

The construction of the present disclosure has been described above in detail through some preferred embodiments. The present disclosure has the structure capable of evenly washing the sole of a foot and between the toes of the foot even without using a hand without bending the waist. Accordingly, even a disabled person having a limited movement can conveniently wash his or her foot.

Furthermore, the foot health care device has the function for automatically washing the device after a foot washing and a foot bath, and thus can solve a conventional management problem. In this case, the foot health care device that has performed the foot washing and foot bath on the user may have an ultraviolet lamp (not illustrated) or a dry device (not illustrated) constructed within the cover of the body part, and may wipe out germs or remove moisture.

The present disclosure is not limited to the aforementioned embodiments, and may be modified and implemented in various ways without departing from the technical spirit of the present disclosure.

INDUSTRIAL APPLICABILITY

As described above, the embodiments of the present disclosure may combine even foot washing and a massage in the state in which a user has been seated in a toilet, in addition to a function as the toilet even in a narrow space.

The invention claimed is:

1. A sitting toilet having a foot health care device attached thereto, the sitting toilet comprising:

a main body comprising a receiving part having a storage space in which the foot health care device is received at a bottom of the main body at a front thereof and comprising a toilet tank and a wastewater duct formed across a top and bottom of the main body in a rear thereof; and the foot health care device comprising a foot washing tank having an inner space in which a foot of a user is placed and having a wastewater outlet formed at a bottom of the foot washing tank, wherein as the foot health care device slides forward from the receiving part of the main body, the inner space of the foot washing tank in which the foot of the user is to be placed opens, and a height of a variable wall body of the foot washing tank increases, and as the foot health care device slides backward toward the receiving part of the main body, the height of the variable wall body decreases to be received in the main body.

2. The sitting toilet of claim 1, wherein:

the receiving part of the main body comprises a sliding rail in a sliding movement section of the foot washing tank, and the foot washing tank has a caster movable on the sliding rail in some section of a top and bottom of the foot washing tank.

3. The sitting toilet of claim 2, wherein an outer wall for air-tightly protecting the sliding movement section of the foot washing tank and supporting a front of the main body is disposed at both ends of the receiving part of the main body.

4. The sitting toilet of claim 1, wherein:

an inner wall is disposed inside the receiving part of the main body, and a sealing structure is provided between a bottom of the inner wall and a bathroom floor in order to block an inflow of stink from a wastewater outlet of the bathroom floor to a room.

5. The sitting toilet of claim 1, wherein the storage space of the receiving part of the main body has a shape and size corresponding to the foot washing tank.

6. The sitting toilet of claim 1, wherein the foot washing tank comprises:

the variable wall body elastically deformed in accordance with the bottom of the toilet tank at a central part of an inner wall that meets the bottom of the toilet tank, and a fixing wall body disposed at both ends of an inner wall that does not meet the bottom of the toilet tank and air-tightly connected to both ends of the variable wall body.

7. The sitting toilet of claim 1, wherein the foot washing tank comprises:

a fixing wall body formed in a range in which the fixing wall body does not touch the bottom of the toilet tank, at both ends of a rear part thereof that faces the toilet tank;

the variable wall body configured to be rotatable within the fixing wall body and to limit washing water from being spilled to an outside; and a connection part configured to air-tightly connect the fixing wall body and the variable wall body and to be extensible so that the variable wall body is moved inside the foot washing tank when the variable wall body touches the bottom of the toilet tank.

8. The sitting toilet of claim 1, wherein the foot health care device comprises:

a spray unit configured to spray predetermined washing water toward the inner space of the foot washing tank;

a washing water supply unit configured to supply the washing water to the spray unit; and a user input unit disposed outside the foot washing tank and configured to display an operating state of the foot health care device and to provide various types of function buttons.

9. The sitting toilet of claim 8, wherein:

the foot health care device further comprises a wastewater discharge unit disposed between the wastewater outlet of the foot washing tank and a wastewater outlet of a bathroom floor, and the wastewater discharge unit comprises:

a wastewater inflow pipe connected to the wastewater outlet of the foot washing tank;

a wastewater discharge pipe connected to the wastewater outlet of the bathroom floor; and a smell blocking unit having a U-shaped form, disposed between the wastewater inflow pipe and the wastewater discharge pipe, and configured to block an inflow of smell from the wastewater outlet of the bathroom floor.

10. The sitting toilet of claim 8, wherein:

a toe washing unit for washing between toes of the user is further included in the inner space of the foot washing tank of the foot health care device, and the toe washing unit comprises:

a toe spray nozzle configured to spray the washing water between the toes of the user, and a washing member attached to an outside of the toe spray nozzle and configured to remove a polluted material stuck between the toes of the user.

11. The sitting toilet of claim 8, wherein:

the spray unit comprises a plurality of side spray nozzles disposed in an inner circumferential surface of the foot washing tank and configured to spray water laterally, and an upward spray nozzle installed at the bottom of the foot washing tank and configured to spray water upward, and among the plurality of side spray nozzles, a side spray nozzle disposed at a front end of the foot washing tank is disposed to be higher than a side spray nozzle disposed at a rear end of the foot washing tank.

12. The sitting toilet of claim 11, wherein the spray unit further comprises:

a downward spray nozzle configured to spray water toward the bottom of the foot washing tank within the foot washing tank;

a cleaning solution nozzle disposed within the foot washing tank and configured to spray a cleaning solution; and a spray valve connected between the downward spray nozzle and the cleaning solution nozzle and configured to selectively adjust the spray of the downward spray nozzle and the cleaning solution nozzle.

13. The sitting toilet of claim 8, wherein:

the foot health care device further comprises a control unit connected to the user input unit and configured to control the spray unit and a toe washing unit for washing between toes of the user, and the control unit controls at least one of a spray pressure, a spray method, and a spray angle of the spray unit.

14. The sitting toilet of claim 13, wherein:

the foot health care device further comprises a heel washing unit rotatably installed at a rear end of the foot washing tank within the foot washing tank and configured to wash a heel of the user, and the heel washing unit is disposed to have a predetermined inclination along a shape of the heel.

15. The sitting toilet of claim 14, wherein the heel washing unit comprises:

a rotation member connected to the rear end of the foot washing tank within the foot washing tank in a width direction or length direction thereof and having a rotatable structure;

a detachable brush having a structure that surrounds the rotation member and having an external rough surface; and a driving unit configured to rotate the rotation member by the control unit.

* * * * *